(12) United States Patent
Ueyama et al.

(10) Patent No.: US 7,397,752 B2
(45) Date of Patent: Jul. 8, 2008

(54) PICKUP FOR MAGNETO-OPTICAL RECORDING MEDIUM

(75) Inventors: Tetsuo Ueyama, Nara (JP); Kohji Minami, Gose (JP); Tomoyuki Miyake, Nara (JP); Yasuo Nakata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 790 days.

(21) Appl. No.: 10/846,282

(22) Filed: May 14, 2004

(65) Prior Publication Data
US 2004/0228256 A1 Nov. 18, 2004

(30) Foreign Application Priority Data

| May 14, 2003 | (JP) | ............................ 2003-136421 |
| Aug. 13, 2003 | (JP) | ............................ 2003-292901 |
| Mar. 9, 2004 | (JP) | ............................ 2004-066123 |

(51) Int. Cl.
*G11B 7/00* (2006.01)
(52) U.S. Cl. ............................ 369/110.02; 369/112.01; 369/112.24
(58) Field of Classification Search ........................ None
See application file for complete search history.

(56) References Cited

U.S. PATENT DOCUMENTS 5,696,750 A * 12/1997 Katayama ............... 369/112.06
7,180,846 B2 * 2/2007 Kim et al. ............... 369/112.17

FOREIGN PATENT DOCUMENTS

| JP | 05-342676 | 12/1993 |
| JP | 06-195795 | 7/1994 |
| JP | 06-243532 | 9/1994 |
| JP | 07-176095 | 7/1995 |
| JP | 8-297875 | 11/1996 |
| JP | 08-297883 | 11/1996 |
| JP | 09-044922 | 2/1997 |

* cited by examiner

*Primary Examiner*—Joseph Feild
*Assistant Examiner*—Tawfik Goma
(74) *Attorney, Agent, or Firm*—David G. Conlin; David A. Tucker; Edwards Angell Palmer & Dodge LLP

(57) ABSTRACT

A pickup for a magneto-optical recording medium is provided, which improves quality of reproduced signals by eliminating a phase difference between the polarizations and is capable of coping with magneto-optical recording media of different recording/reproducing systems. A return light beam of light reflected by a magneto-optical recording medium is polarized and separated into ± first-order diffracted lights through a light-branching diffraction element provided between a light source and an objective lens. The ± first-order diffracted lights are compensated for their phases through first and second phase compensation elements so that there is no phase difference between the polarizations, and are, further, polarized and separated through the first and second polarization/separation elements, and are received by first and second light detectors. Use of the first and second phase compensation elements having different phase compensation amounts makes it possible to cope with the magneto-optical recording media of different recording/reproducing systems.

13 Claims, 16 Drawing Sheets

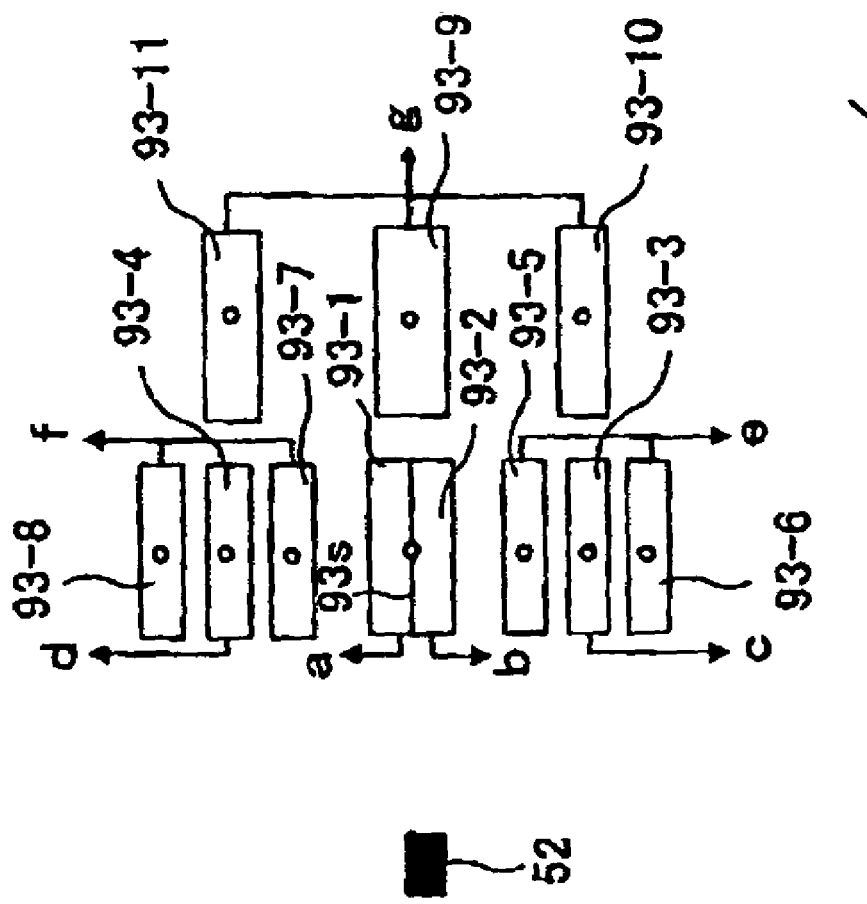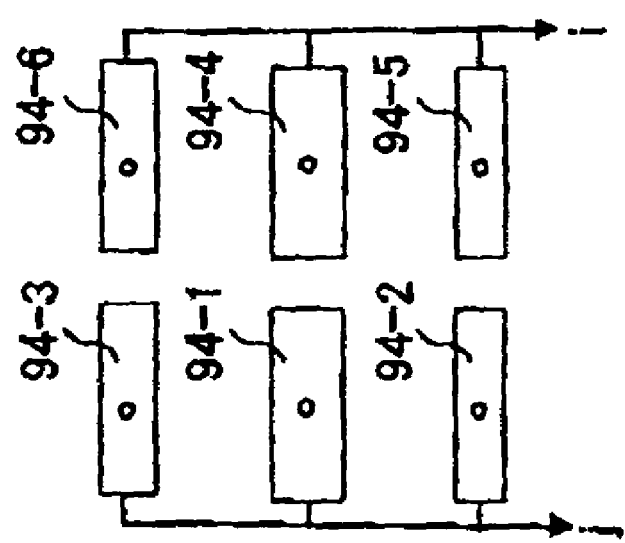
FIG. 13

PICKUP FOR MAGNETO-OPTICAL RECORDING MEDIUM

BACKGROUND OF THE INVENTION

1. Field of the Invention

The present invention relates to a pickup for a magneto-optical recording medium, for recording information into magneto-optical recording media and/or for reproducing information from the magneto-optical recording medium.

2. Description of the Related Art

A widely known example of a recording medium for recording information by using a magneto-optical recording system may be a mini disc (abbreviated as MD) having a diameter of 64 mm for recording music information. In addition to the MD, the recording medium employing the magneto-optical recording system can be represented by an MO disk used for an MO (magneto-optical) disk drive which is an external storage unit for a computer. There have now been used MO disks of various standards having different recording systems and different recording film structures.

There have been proposed various ultra-resolution technologies for strikingly improving the recording capacities of the magneto-optical recording/reproducing systems that deal with the MDs or the MO disks. For example, there is a method called magnetic field modulation recording system for recording marks smaller than a diameter of a light beam. As methods of reproducing marks smaller than the diameter of a light beam, further, there have been proposed a magnetic super-resolution technology called MSR (Magnetic Super-Resolution), a magnetic domain expanding reproduction method called MAMMOS (Magnetic AMplifying Magneto Optical System) and a magnetic wall displacement detection technology called DWDD (DomainWall Displacement Detection). The magneto-optical recording medium (disk) to which the DWDD system is applied is constituted by at least three magnetic film layers, i.e., a domain wall displacement layer, a switching layer and a magnetic recording layer (memory layer), and in which the size of a magnetic domain effectively recorded is expanded in a region where the temperature of the magnetic film has exceeded the Curie temperature of the switching layer by utilizing the displacement of the magnetic wall in the magnetic wall displacement layer in the case of information reproduction thereby to increase the reproduced carrier signals.

There have further been proposed optical pickups based on the magneto-optical recording system in various constitutions concerning the optical system one of the related arts that are proposed, such as Japanese Unexamined Patent Publication JP-A 8-297875 (1996), may be an integrated unit in which a detection system for detecting servo signals and magneto-optical signals is incorporated in a package and an optical pickup of a decreased size. FIG. 18 is a side view of an arrangement illustrating, in a simplified manner, the constitution of an optical pickup 1 according to a related art, and FIG. 19 is a plan view of an arrangement of a light detector 7 provided in the optical pickup 1 illustrated in FIG. 18.

The optical pickup 1 according to the related art includes a semiconductor laser element 2, a grating 3, first polarization/separation means 4, an objective lens 5, a second polarization/separation means 6, and a light detector 7. The semiconductor laser element 2, grating 3, first polarization/separation means 4, second polarization/separation means 6 and light detector 7 are incorporated in a package 8. The first polarization/separation means 4 is formed on a surface of a glass substrate 9 which is a base material facing the objective lens 5, and the second polarization/separation means 6 is formed on a surface of the glass substrate 9 on the side opposite to the surface on where the first polarization/separation means 4 is formed, i.e., on the surface facing the semiconductor laser 2. The first polarization/separation means 4 is a polarizing hologram having an enhancing function formed on, for example, a birefringent substrate, and has an optical axis that is so set as to be perpendicular to the direction of polarization of the light beam from the semiconductor laser element 2, permitting ordinary light to pass through and diffracting extraordinary light.

The light beam going out from the semiconductor laser element 2 passes through the first polarization/separation means 4 and is projected onto an information recording surface of an MO disk 10 (abbreviated as MOD) which is a magneto-optical recording medium. A light beam (hereinafter called return light beam) reflected by the MOD 10 passes through the objective lens 5 again and falls on the first polarization/separation means 4. The return light beam falling on the first polarization/separation means 4 is diffracted into at least zero (0)-order diffracted light and plus and minus (±) first-order diffracted lights through the first polarization/separation means 4. The ± first-order diffracted lights of the return light beam diffracted by the first polarization/separation means 4 fall on the second polarization/separation means 6.

The second polarization/separation means 6 comprises members split into two, i.e., second polarization/separation means (I) 6a and second polarization/separation means (II) 6b, which are arranged being divided into the right and the left on the surface of the paper in FIG. 18. The second polarization/separation means (I) 6a and the second polarization/separation means (II) 6b are polarizing holograms which are so constituted as to diffract extraordinary light. The second polarization/separation means 6 is so arranged that the optical axis of the substrate is at an angle of 45 degrees with respect to the direction of polarizing the light beam from the semiconductor laser element 2, and permits ordinary light to pass through while diffracting extraordinary light.

The + first-order diffracted light diffracted through the first polarization/separation means 4 falls on the second polarization/separation means (I) 6a which permits the zero-order diffracted light that is incident to pass through while refracting the – first-order diffracted light. The – first-order diffracted light diffracted through the first polarization/separation means 4 falls on the second polarization/separation means (II) 6b which permits the zero-order diffracted light that is incident to pass through while refracting the + first-order diffracted light. The zero-order light and the ± first-order diffracted light diffracted through the second polarization/separation means (I) 6a and (II) 6b fall on the portions 7a and 7b of the light detector 7. Namely, the zero-order diffracted light and the – first-order diffracted light through the second polarization/separation means (I) 6a fall on the portion 7a of the light detector 7, and the zero-order diffracted light and the + first-order diffracted light through the second polarization/separation means (II) 6b fall on the portion 7b of the light detector 7.

Referring to FIG. 19, the light detector 7 includes a first light detector 7a and a second light detector 7b separated into the right and the left with respect to the semiconductor laser element 2. The first and second light detectors 7a and 7b include main light-receiving portions 15, 12 for receiving main beams, and sub-light-receiving portions 14, 16 and 11, 13 for receiving sub-beams. The main light-receiving portions 12 and 15 are further divided into the right and the left. If the right and left outputs of the main light-receiving portion 12 are denoted by a and b, and the right and left outputs of the main light-receiving portion 15 by c and d, then, the read signal MO of the MOD 10 is given by the following formula (1). The method of detecting servo signals is not described here. According to the related art, the optical pickup is realized in a small size relying upon the constitution.

$$MO=(a+d)-(b+c) \quad (1)$$

In the optical pickup 1 according to the related art, the polarizing hologram is used as the first polarization/separation means 4 for diffracting the return light beam from the MOD 10 toward the light detector 7. Here, however, the polarizing hologram includes an enhancing function for improving the quality of signals by increasing the degree of modulation of the magneto-optical reproduced signals. That is, the optical axis of the birefringent substrate constituting the polarizing hologram is set to be perpendicular to the direction of polarizing the light beam emitted from the semiconductor laser element 2 so that, for example, the diffraction efficiencies for the ordinary light (p-polarization) are 67% of zero-order light and 27% of t first-order light, and the diffraction efficiencies for the extraordinary light (s-polarization) are 18% of zero-order light and 76% of ± first-order light.

However, a phase difference is often included between the p-polarization and the s-polarization of the ± first-order diffracted lights for detecting the magneto-optical reproduced signals arousing a problem in that the quality of the reproduced signals is greatly deteriorated as the phase difference increases, i.e., as the linearly polarized light becomes the elliptically polarized light. As the magneto-optical recording media, further, there have been proposed ultra-resolution media having various recording film structures. In the DWDD system of the magnetic multi-layer film structure, however, even when the linearly polarized light is incident on the magneto-optical recording medium, there takes place a case where the return light beam itself modulated by Kerr rotation angle returns back as the elliptically polarized light, i.e., there takes place a case where a phase difference occurs between the polarized component of the incident light and a component perpendicular thereto. In this case, too, the quality of the reproduced signals is greatly deteriorated like when a phase difference occurs between the p-polarization and the s-polarization of the ± first-order diffracted lights through the polarizing hologram. Therefore, there remains a problem in that a single optical pickup cannot cope with the magneto-optical recording media of different recording/reproducing systems.

SUMMARY OF THE INVENTION

It is an object of the invention to provide a pickup for a magneto-optical recording medium, which improves quality of reproduced signals by eliminating a phase difference between the polarized lights and is capable of coping with magneto-optical recording media of different recording/reproducing systems.

The invention provides a pickup for a magneto-optical recording medium, for recording information into a magneto-optical recording medium and/or reproducing information from a magneto-optical recording medium, comprising:

a light source for emitting light;

an objective lens for collecting light emitted from the light source onto an information recording surface of a magneto-optical recording medium;

a light-branching diffraction element provided between the light source and the objective lens, and for diffracting light reflected by the magneto-optical recording medium and has passed through the objective lens;

first and second polarization/separation elements for polarizing and separating + first-order diffracted light and − first-order diffracted light that are diffracted through the light-branching diffraction element, respectively;

first and second light detectors for receiving and detecting light separated by the first and second polarization/separation elements, respectively;

a first phase compensation element provided on the optical passage of the + first-order diffracted light between the light-branching diffraction element and the first polarization/separation element; and a second phase compensation element provided on the optical passage of the − first-order diffracted light between the light-branching diffraction element and the second polarization/separation element.

In the invention, further, an amount of phase compensation of the first phase compensation element is different from an amount of phase compensation of the second phase compensation element.

In the invention, further, the magneto-optical recording medium includes a first magneto-optical recording medium and a second magneto-optical recording medium which have different recording film structures, the first phase compensation element has an amount of phase compensation corresponding to reproduced signals from the first magneto-optical recording medium, and the second phase compensation element has an amount of phase compensation corresponding to reproduced signals from the second magneto-optical recording medium.

In the invention, further, the light-branching diffraction element is a polarizing diffraction element having a function for amplifying Kerr rotation angle.

In the invention, further, (a) the polarizing diffraction element is made of a material having an ordinary light refractive index no and an extraordinary light refractive index ne, (b) the polarizing diffraction element has a plurality of grooves formed in at least one surface thereof, and (c) the polarizing diffraction element has an isotropic material filled in the plurality of grooves, the isotropic material having a refractive index na different from the ordinary light refractive index no and from the extraordinary light refractive index ne.

In the invention, further, the first and second polarization/separation elements are polarizing diffraction elements.

In the invention, further, at least either one of the first polarization/separation element or the second polarization/separation element is divided into a plurality of regions having different groove structures.

In the invention, further, the first and second polarization/separation elements are birefringent crystalline substrates.

In the invention, further, the light-branching diffraction element is provided on one surface of a transparent substrate, and the first and second polarization/separation elements are provided on another surface of the transparent substrate.

In the invention, further, an air layer is formed between the light-branching diffraction element and the first and second polarization/separation elements for permitting the passage of reflected light from the light-branching diffraction element to the first and second polarization/separation elements.

In the invention, the pickup further comprises a first transparent substrate, a second transparent substrate, and a holding substrate for holding the first and second transparent substrates, wherein the light-branching diffraction element is provided on the first transparent substrate, and the first and second polarization/separation elements are provided on the second transparent substrate, the first transparent substrate is mounted on a surface of the holding substrate on a side of the objective lens, and the second transparent substrate is mounted on a surface of the holding substrate on a side of the light source, and a through hole is formed in the holding substrate from the surface on which the first transparent substrate is mounted through up to the surface on which the second transparent substrate is mounted to thereby form the air layer.

In the invention, the pickup further comprises a diffraction grating for three beams for separating the light emitted from the light source into three beams, wherein the first and second polarization/separation elements are provided on one surface of the holding substrate on which the second transparent substrate is mounted, and the diffraction grating for three beams is provided on another surface of the second transparent substrate.

In the invention, further, at least one or more cut-away portions are formed in the holding substrate.

In the invention, further, a collimator lens is provided between the objective lens and the light-branching diffraction element, the collimator lens being disposed closer to the objective lens than the first transparent substrate and being mounted on the holding substrate.

In the invention, further, the holding substrate constitutes a casing for accommodating the light source, and the first and second light detectors.

According to the invention, the phase compensation elements are provided between the light-branching diffraction element that diffracts light reflected by the magneto-optical recording medium and has passed through the objective lens and the polarization/separation elements for polarizing and separating light diffracted by the light-branching diffraction element. Therefore, the phase difference between the polarized lights is cancelled by the phase compensation elements, and the quality of reproduced signals is improved. Further, a first phase compensation element is provided between the light-branching diffraction element and the first polarization/separation element, and a second phase compensation element is provided between the light-branching diffraction element and the second polarization/separation element. Therefore, the reproduction characteristics can be exhibited to a sufficient degree for the two kinds for magneto-optical recording media, i.e., for a high-density recording medium based on, for example, DWDD and a recording medium of an ordinary density.

According to the invention, further, the amount of phase compensation of the first phase compensation element is different from the amount of phase compensation of the second phase compensation element. Further, the magneto-optical recording medium includes a first magneto-optical recording medium and a second magneto-optical recording medium having different recording film structures, and the first phase compensation element has a phase compensation amount corresponding to the reproduced signals from the first magneto-optical recording medium, and the second phase compensation element has a phase compensation amount corresponding to the reproduced signals from the second magneto-optical recording medium. Therefore, the reproduced signals from the first magneto-optical recording medium are compensated for their phases by the first phase compensation element, and the reproduced signals from the second magneto-optical recording medium are compensated for their phases by the second phase compensation element to thereby improve quality of the reproduced signals. Therefore, a single optical pickup can now be used for the magneto-optical recording media of different magneto-optical recording systems without the need of attaching/detaching the phase compensation elements or without turning on/off the liquid crystal compensation element depending upon the kind of the magneto-optical recording medium.

According to the invention, further, a polarizing diffraction element having a function for amplifying Kerr rotation angle is used as the light-branching diffraction element not only to separate the light reflected by the magneto-optical recording medium from the path but also to detect magneto-optical signals having improved signal quality by amplifying Kerr rotation angle and, hence, by increasing the degree of modulation.

According to the invention, further, the polarizing diffraction element which is the light-branching diffraction element is formed by using a birefringent material making it possible to arbitrarily set diffraction efficiencies for ordinary light and extraordinary light. That is, in the diffracted light, it is allowed to arbitrarily set the ratio of ordinary light and extraordinary light of which the polarizing directions are meeting at right angles and, hence, to constitute a polarizing diffraction element for amplifying Kerr rotation angle.

According to the invention, further, the first and second polarization/separation elements are the polarizing diffraction elements which make it possible to greatly set the angle of polarization and separation, facilitating the separation of beam on the light detectors and offering an increased degree of freedom for arranging the light detectors. By using the polarization/separation elements divided into a plurality of regions having different groove structures, further, it is allowed not only to separate the polarized light but also to easily divide the wave surface making it possible to simultaneously add a function of a hologram for forming servo signals.

According to the invention, further, the first and second polarization/separation elements are birefringent crystalline substrates. The birefringent crystalline substrates are simple in their structure and make it possible to lower the cost of production. Further, the birefringent crystalline substrates exhibit very stable polarization/separation characteristics for wavelength fluctuations of light emitted from the light source, and feature high operation reliability.

According to the invention, further, the light-branching diffraction element is provided on one surface of the transparent substrate, and the first and second polarization/separation elements are provided on the other surface of the transparent substrate. Upon forming the light-branching diffraction element and the first and second polarization/separation elements integrally together, the space for installation is saved and the apparatus is realized in a small size. Upon forming the light-branching diffraction element and the first and second polarization/separation elements in advance integrally together, further, a decreased number of parts are handled in assembling the apparatus and the production efficiency can be enhanced.

According to the invention, the pickup further comprises a first transparent substrate, a second transparent substrate, and a holding substrate for holding the first and second transparent substrates, wherein the light-branching diffraction element is provided on the first transparent substrate, and the first and second polarization/separation elements are provided on the second transparent substrate, and the first transparent substrate is mounted on the surface of the holding substrate on the side of the objective lens, and the second transparent substrate is mounted on the surface of the holding substrate on the side of the light source. Further, a through hole is formed in the holding substrate from a surface on which the first transparent substrate is mounted through up to the surface on which the second transparent substrate is mounted to thereby form the air layer permitting the passage of reflected light from the light-branching diffraction element to the first and second polarization/separation elements. This increases the air conversion length (distance/refractive index) between the light-branching diffraction element and the first and second polarization/separation element, making it possible to substantially decrease the height of the light-branching diffraction element in the direction of optical axis and, hence, to realize the apparatus in a small size and in a reduced thickness. Besides, the light-branching diffraction element having a large groove pitch can be easily produced. Further, use of the holding substrate makes it possible to easily mount the first phase compensation element and the second phase compensation element even when they have thicknesses different from each other.

According to the invention, further, the first and second polarization/separation elements as well as the diffraction grating for three beams are provided on the second transparent substrate. It is therefore allowed to decrease the number of parts at the time of assembling the apparatus and to improve positioning precision of the diffraction grating for three beams relative to the first and second polarization/separation elements.

According to the invention, further, at least one or more cut-away portions are formed in the holding substrate making it easy to hold a member which integrally includes the first transparent substrate, light-branching diffraction element mounted on the first transparent substrate, second transparent substrate, first and second polarization/separation elements mounted on the second transparent substrate, and holding plate, at the time of handling and adjustment, contributing to shortening the time for adjustment and improving the precision of adjustment.

According to the invention, further, the collimator lens is integrally mounted on the holder substrate, and there is no need of providing the housing of the optical pickup with the holder or the holding portion for the collimator lens. There is thus realized the apparatus in a small size and in a simplified structure. It further becomes possible to correctly position the collimator lens with respect to the light source.

According to the invention, further, the holding substrate constitutes a casing for containing the light source and the first and second light detectors. The light source and the first and second light detectors constitute a so-called integrated unit. The integrated unit is covered with a cap which is a protection member. By constituting the casing with the holding substrate working as a cap, however, there is no need of forming the cap as a separate member. Therefore, the number of parts can be decreased, the operation efficiency is improved in the step of assembling the apparatus, the effect due to tolerance in the height of the cap is eliminated, and the assembling error as a whole is decreased.

BRIEF DESCRIPTION OF THE DRAWINGS

Other and further objects, features, and advantages of the invention will be more explicit from the following detailed description taken with reference to the drawings wherein:

FIG. 13 is a plan view illustrating the constitution of first and second light detectors provided for the pickup illustrated in FIG. 12;

DETAILED DESCRIPTION

Figure 1:
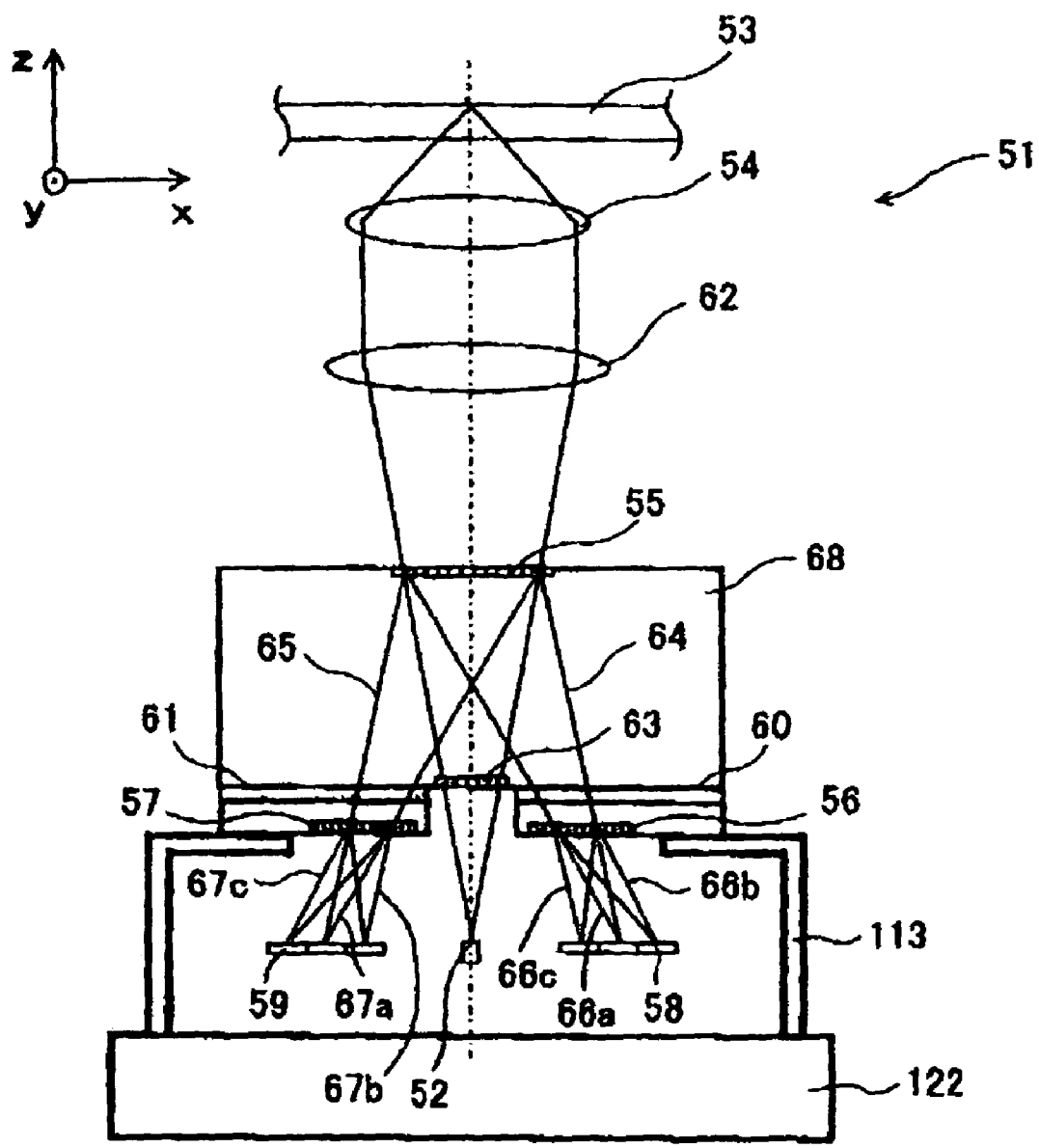
FIG. 1 is a side view of an arrangement illustrating, in a simplified manner, the constitution of a pickup for a magneto-optical recording medium according to a first embodiment of the invention.

Now referring to the drawings, preferred embodiments of the invention are described below.

FIG. 1 is a side view of an arrangement illustrating, in a simplified manner, the constitution of a pickup 51 for a magneto-optical recording medium according to a first embodiment of the invention. The pickup 51 for a magneto-optical recording medium (hereinafter simply referred to as a pickup) includes a light source 52, an objective lens 54, a light-branching diffraction element 55, first and second polarization/separation elements 56 and 57, first and second light detectors 58 and 59, a first phase compensation element 60, a second phase compensation element 61, and a collimator lens 62 the light source 52 emits light. The objective lens 54 collects the light emitted from the light source 52 onto an information recording surface of a magneto-optical recording medium 53 (often called magneto-optical disk). The light-branching diffraction element 55 is disposed between the light source 52 and the objective lens 54 and diffracts the light (often called return light) reflected by the magneto-optical recording medium 53 and has passed through the objective lens. The first and second polarization/separation elements 56 and 57 polarize and separate + first-order diffracted light 64 and − first-order diffracted light 65 diffracted through the light-branching diffraction element 55, respectively. The first and second light detectors 58 and 59 receive and detect the light separated by the first and second polarization/separation elements 56 and 57, respectively. The first phase compensation element 60 is provided on an optical path of the + first-order diffracted light 64 between the light-branching diffraction element 55 and the first polarization/separation element 56. The second phase compensation element 61 is provided on an optical path of the − first-order diffracted light 65 between the light-branching diffraction element 55 and the second polarization/separation element 57. The collimator lens 62 is provided between the light-branching diffraction element 55 and the objective lens 54 The pickup 51 is used for recording information into the magneto-optical recording medium 53 and/or for reproducing information from the magneto-optical recording medium 53.

As for the three-dimensional azimuth axes drawn in FIG. 1 in a state where the magneto-optical recording medium 53 is mounted on the pickup 51, the x-axis represents a direction of radius of the magneto-optical recording medium 53, the y-axis represents a direction of a tangential line of a track formed in the information recording surface of the magneto-optical recording medium 53, and the z-axis represents a direction that meets at right angles with the x-axis and the y-axis. In the pickup 51 of this embodiment, the z-axis is in agreement with the axial direction of light emitted from the light source 52. The notation of x-, y- and z-axes is commonly used throughout the specification.

A semiconductor laser is used as the light source 52. The magneto-optical recording medium 53 is, for example, an MO disk. Though FIG. 1 illustrates only one magneto-optical disk 53 that is mounted on the pickup 51, it is possible to mount another magneto-optical recording medium based on a different magneto-optical recording system in a manner to replace for the magneto-optical disk 53 to record/reproduce the information.

Figure 2:
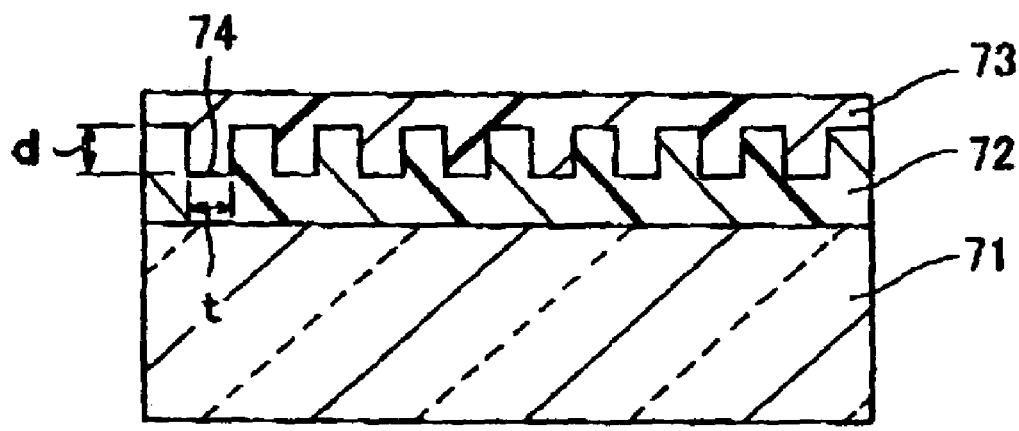
FIG. 2 is a sectional view illustrating the constitution of a light-branching diffraction element.

In this embodiment, the light-branching diffraction element 55 is a polarizing hologram forming grooves in the birefringent crystalline layer. FIG. 2 is a sectional view illustrating the constitution of the light-branching diffraction element 55. The polarizing hologram which is the light-branching diffraction element 55 is formed in a manner as described below. A glass substrate 71 is provided, and a liquid crystalline monomer oriented on the glass substrate 71 is polymerized by the irradiation with an ultraviolet ray to form an anisotropic polymer layer 72 having optical anisotropy (birefringent property). A plurality of grooves 74 having a width t and a depth d are formed in the anisotropic polymer layer 72 so as to extend in parallel with each other. The grooves 74 formed in the anisotropic polymer layer 72 are filled with a photopolymer of an isotropic material to thereby form an isotropic photopolymer layer 73 and to form the polarizing hologram 55.

An optical axis of the polarizing hologram.55 is brought into agreement with a polarization direction (x-axis direction) of the light beam emitted from the semiconductor laser 52, or is intersected therewith at right angles, and parameters such as the groove depth d and the like are suitably selected, so that ordinary light is partly transmitted through and extraordinary light is partly diffracted. The polarizing hologram 55 has a function (enhancing function) for amplifying Kerr rotation angle necessary for detecting the magneto-optical signals.

Described below are the conditions for constituting the polarizing hologram 55 for expressing the enhancing function. The ordinary light refractive index no of the optically anisotropic polymer constituting the anisotropic polymer layer 72 is set to be 1.5, the extraordinary light refractive index ne thereof is set to be 1.65, and the optical axis thereof is set to be in agreement with the polarization direction (x-axis direction) of the light beam emitted from the semiconductor laser 52. When exemplified concerning the case of the diffraction grating having a duty ratio of 50%, the groove depth d is set to be 1.8 μm and the refractive index na of the optically isotropic photopolymer constituting the isotropic photopolymer layer 73 is set to be 1.43 for the light of a wavelength of 780 nm, such that the diffraction efficiencies are 76% of zero-order light, 10% of + first-order light and 10% of − first-order light for the ordinary light (p-polarization) and that the diffraction efficiencies are 0% of zero-order light, 41% of + first-order light and 41% of − first-order light for the extraordinary light (s-polarization), to thereby realize the enhancing function. Here, the polarization in the x-axis direction becomes the p-polarized component and the polarization in the y-axis direction becomes the s-polarized component.

When exemplified concerning the case where the optical axis of the anisotropic polymer layer 72 is set to the direction (y-axis direction) at right angles with the direction (x-axis direction) in which is polarized the light beam emitted from the semiconductor laser 52 and the diffraction grating has a duty ratio of 50%, then, the groove depth d is set to be 1.8 μm and the refractive index na of the isotropic photopolymer is set to be 1.72 for the light of a wavelength of 780 nm, such that, contrary to the above-mentioned case, the diffraction efficiencies are 76% of zero-order light, 10% of + first-order light and 10% of − first-order light for the extraordinary light (p-polarization) and that the diffraction efficiencies are 0% of zero-order light, 41% of + first-order light and 41% of − first-order light for the ordinary light (s-polarization), to thereby realize the enhancing function.

The first and second polarization/separation elements 56 and 57 are polarizing holograms. Unlike the polarizing hologram having the enhancing function used as the light-branching diffraction element 55, the polarizing holograms used as the first and second polarization/separation elements 56 and 57 are so set as to transmit all of ordinary light and diffract all of extraordinary light. In order to differentially detect the magneto-optical signals, the polarizing holograms used as the first and second polarization/separation elements 56 and 57 are so arranged that the optical axes of the optically anisotropic (birefringent) polymer layers are at angles of 45 degrees with respect to the polarization direction (x-axis direction) of the light beam emitted from the semiconductor laser 52.

Like the case of the polarizing hologram which is the light-branching diffraction element 55 described above, mentioned below is a case where the ordinary light refractive index no of the optically anisotropic polymer is set to be 1.5, the extraordinary light refractive index ne thereof is set to be 1.65, and the diffraction grating has a duty ratio of 50%. The groove depth d is set to be 2.6 μm and the refractive index na of the optically isotropic photopolymer is set to be 1.5 for the light of a wavelength of 780 nm, such that the diffraction efficiencies are 100% of zero-order light, 0% of + first-order light and 0% of − first-order light for the ordinary light (polarization in the direction of 45 degrees with respect to the x-axis direction) and that the diffraction efficiencies are 0% of zero-order light, 41% of + first-order light and 41% of − first-order light for the extraordinary light (polarization in the direction of −45 degrees with respect to the x-axis direction), to polarize and separate the light beam into components meeting at right angles in the directions of 45 degrees relative to the polarization direction (x-axis direction) of the light beam emitted from the semiconductor laser 52.

As the first and second phase compensation elements 60 and 61, there can be used a biaxial birefringent crystalline plate such as of quartz crystal or a resin sheet having highly birefringent property, that have, generally, been used as wavelength plates.

In the pickup 51 of this embodiment, the light-branching diffraction element 55 is provided on one surface of the transparent substrate 68 facing the collimator lens 62, and the first and second polarization/separation elements 56, 57 are provided on the other surface of the transparent substrate 68 facing the semiconductor laser 52. That is, the light-branching diffraction element 55, and the first and second polarization/separation elements 56, 57 are so formed as to constitute an integral member.

The p-polarized component and the s-polarized component exist in the + first-order diffracted light 64 and in the − first-order diffracted light 65 of a return light beam diffracted by the polarizing hologram which is the light-branching diffraction element 55, and a phase difference occurs between them since the diffraction efficiency is different for the p-polarized component and the s-polarized component. The light beam incident on the magneto-optical recording medium 53 due to linear polarization turns into a return light beam of which the direction of polarization is slightly rotated due to Kerr effect of the magneto-optical recording medium. In general, however, as the linear polarization turns into elliptic polarization due to the phase difference added by the optical parts, there results a decrease in the degree of modulation for the magneto-optical reproduced signals and in the quality of the reproduced signals.

The first and second phase compensation elements 60 and 61 are the optical elements provided for canceling the phase difference. The first phase compensation element 60 gives a phase compensation amount for canceling the phase difference imparted to the + first-order diffracted light 64 due to the light-branching diffraction element 55.

The second phase compensation element 61 gives a phase compensation amount different from that of the first phase compensation element 60. When the magneto-optical recording medium of a different standard having a different recording film structure is reproduced, a phase compensation amount is given even to the phase difference between the p-polarization and the s-polarization which are steadily added to the light reflected by the magneto-optical recording medium to cancel the phase difference in addition to canceling the phase difference added to the − first-order diffracted light 65 by the polarizing hologram of the light-branching diffraction element 55.

In the pickup 51, the light beam emitted from the semiconductor laser 52 is divided by a grating 63 into three beams including a main beam and two sub-beams, which, then, pass through the light-branching diffraction element 55 and are turned into nearly parallel beams through the collimator lens 62, and are focused by the objective lens 54 onto the information recording surface of the magneto-optical recording medium 53. The return light beam reflected by the magneto-optical recording medium 53 passes again through the objective lens 54 and the collimator lens 62, and is guided to the light-branching diffraction element 55.

The + first-order diffracted light 64 of the return light beam diffracted by the light-branching diffraction element 55 is compensated for its phase difference by the first phase compensation element 60 and falls on the first polarization/separation element 56, while the − first-order diffracted light 65 of the return light beam diffracted by the light-branching diffraction element 55 is compensated for its phase difference by the second phase compensation element 61 and falls on the second polarization/separation element 57.

The + first-order diffracted light 64 of the return light beam is further separated by the first polarization/separation element 56 into zero-order diffracted light 66a and ± first-order diffracted lights 66b and 66c which are polarized components meeting at right angles with each other, and fall on the first light detector 58. The − first-order diffracted light 65 of the return light beam is further separated by the second polarization/separation element 57 into zero-order diffracted light 67a and ± first-order diffracted lights 67b and 67c which are polarized components meeting at right angles with each other, and fall on the second light detector 59.

In the pickup 51 of the invention as described above, a feature resides in that the + first-order diffracted light 64 and the − first-order diffracted light 65 of the return light beam diffracted by the light-branching diffraction element 55 are compensated for their phases by the first phase compensation element 60 and by the second phase compensation element 61 before they are polarized and separated by the first polarization/separation element 56 and by the second polarization/separation element 57. Besides, the amount of phase compensation given by the first phase compensation element 60 to the + first-order diffracted light 64 of the return light beam is different from the amount of phase compensation given by the second phase compensation element 61 to the − first-order diffracted light 65 of the return light beam.

For the first magneto-optical recording medium, therefore, the phase difference of the return light beam is compensated by the first phase compensation element 60 and the magneto-optical signals are reproduced by the first light detector 58. For the second magneto-optical recording medium of a standard different from the first magneto-optical recording medium and which steadily generates a phase difference in the return light beam, the phase difference of the return light beam is compensated by the second phase compensation element 61 and the magneto-optical signals are reproduced by the second light detector 59. Therefore, a single optical pickup can be used for the magneto-optical recording media of different magneto-optical recording systems without attaching or detaching phase compensation element or without turning the liquid crystal compensation element on or off depending upon the kind of the magneto-optical recording medium.

Figure 3:
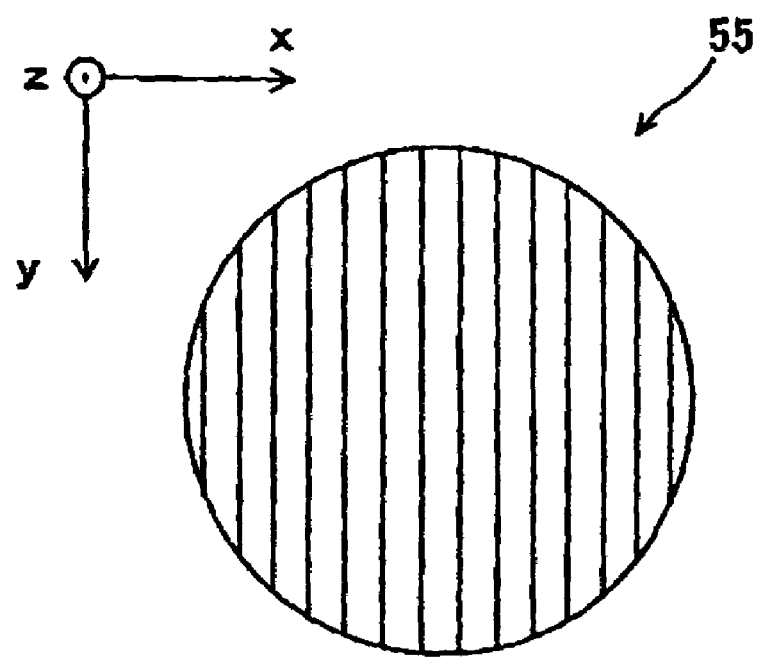
FIG. 3 is a plan view illustrating the constitution of the light-branching diffraction element.
Figure 4:
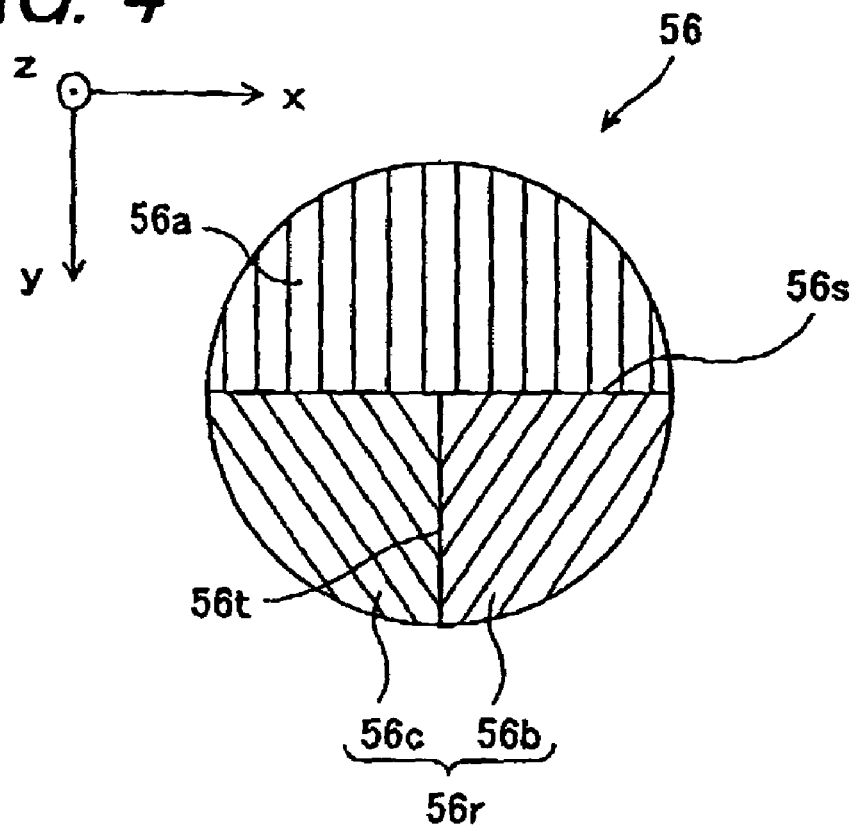
FIG. 4 is a plan view illustrating the constitution of a first polarization/separation element.
Figure 5:
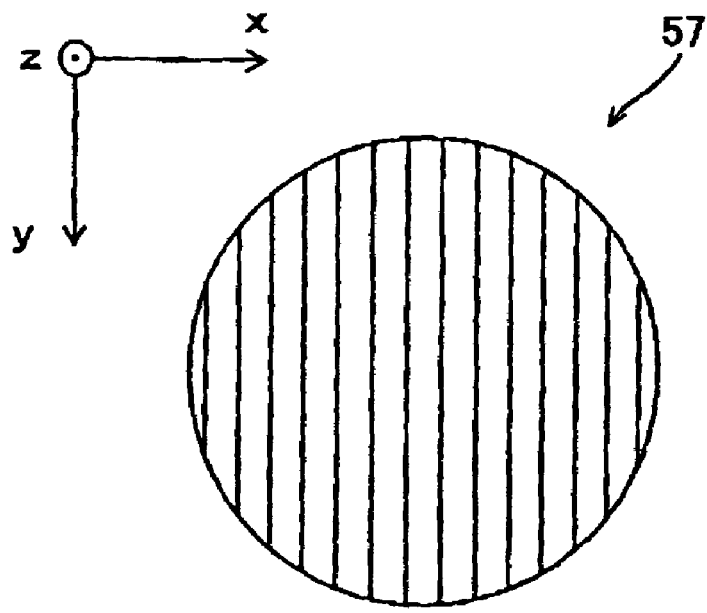
FIG. 5 is a plan view illustrating the constitution of a second polarization/separation element.
Figure 6:
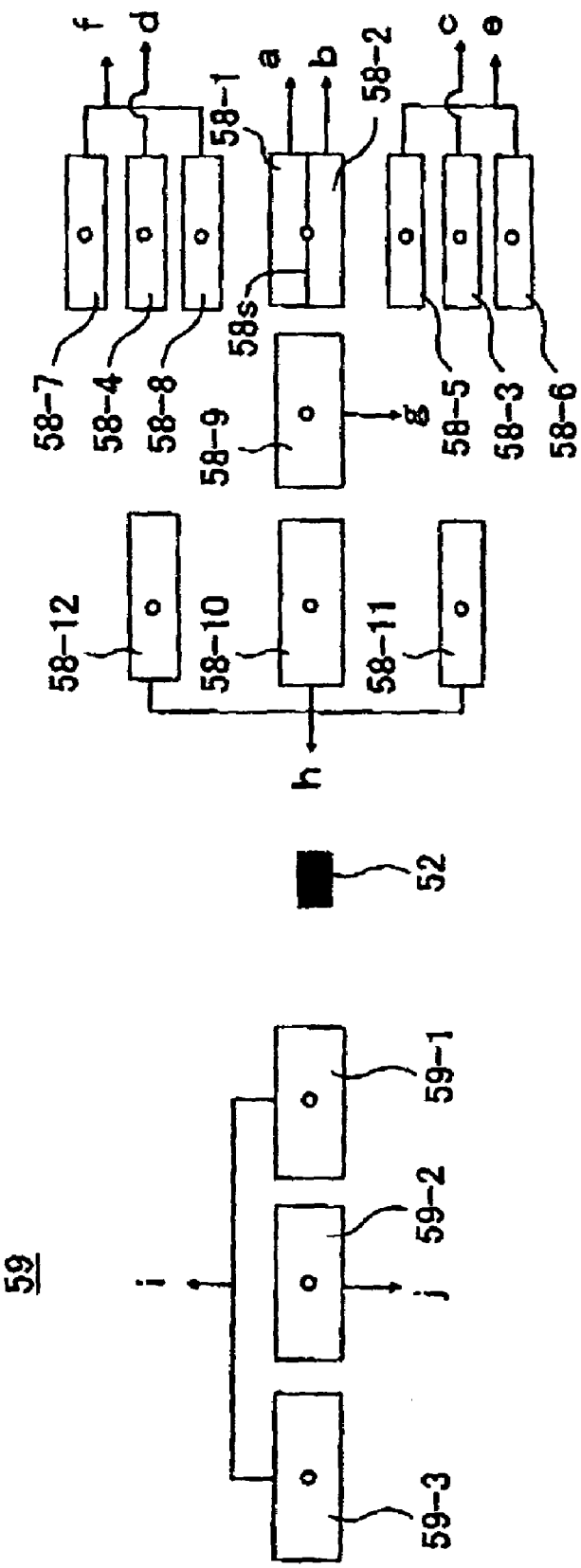
FIG. 6 is a plan view illustrating the constitution and arrangement of first and second light detectors.

FIG. 3 is a plan view illustrating the constitution of the light-branching diffraction element 55, FIG. 4 is a plan view illustrating the constitution of the first polarization/separation element 56, FIG. 5 is a plan view illustrating the constitution of the second polarization/separation element 57, and FIG. 6 is a plan view illustrating the constitution and arrangement of the first and second light detectors 58 and 59. Hereinafter, detection of the magneto-optical signals reproduced by the pickup 51 will be described with reference to FIGS. 3 to 6.

The light-branching diffraction element 55 which is the polarizing hologram is constituted without being divided, and the return light beam passing through the light-branching diffraction element 55 is diffracted in its state to form ± first-order diffracted lights 64 and 65 which fall on the first and second polarization/separation elements 56 and 57.

The first polarization/separation element 56 is divided, by a split line 56s in parallel with the x-axis direction, into two, i.e., a first divided region 56a and a remaining portion 56r.

The remaining portion 56r is further divided, by a split line 56t in parallel with the y-axis direction, into two, i.e., second and third divided regions 56b and 56c. The first to third divided regions 56a, 56b and 56c have different groove structures such as pitches and groove directions. That is, the first polarization/separation element 56 has a function for polarizing and separating the + first-order diffracted light 64 that is diffracted through the light-branching diffraction element 55 and, further, has a wave surface-splitting function for diffraction into different directions.

The first light detector 58 includes a pair of two-split light-receiving regions 58-1 and 58-2, as well as other individual light-receiving regions 58-3, 58-4, 58-5, 58-6, 58-7, 58-8, 58-9, 58-10, 58-11 and 58-12.

Of the main beam and two sub-beams included in the return light beam, the main beam is such that the zero-order diffracted light 66a (ordinary light component corresponding to the polarized component in a direction of 45 degrees with respect to the x-axis direction) diffracted through the first polarization/separation element 56 passes through and falls on the light-receiving region 58-9 As for the + first-order diffracted light 66b diffracted through the first polarization/ separation element 56, the light diffracted by the first divided region 56a of the first polarization/separation element 56 and is being focused is collected on the split line 58s extending in the x-axis direction of the two-split light-receiving regions 58-1 and 58-2, and the lights diffracted by the second and third divided regions 56b and 56c are collected on the light-receiving regions 58-3 and 58-4. As for the two sub-beams, further, the + first-order diffracted light 66b diffracted by the second divided region 56b of the first polarization/separation element 56 is collected on the light-receiving regions 58-5 and 58-6, and the + first-order diffracted light 66b diffracted by the third divided region 56c is collected on the light-receiving regions 58-7 and 58-8.

As for the − first-order diffracted light 66c of the main beam diffracted by the first polarization/separation element 56, the light diffracted by the first divided region 56a is collected on the light-receiving region 58-10, and the lights diffracted by the second and third divided regions 56b and 56c are collected on the light-receiving regions 58-11 and 58-12, respectively.

As described above, the first polarization/separation element 56 is capable of simultaneously effecting the polarization and separation of the zero-order diffracted light and ± first-order diffracted lights, and the division of the beam into three through the first to third divided regions 56a, 56b and 56c.

Referring to FIG. 5, the second polarization/separation element 57 is constituted without being divided, and polarizes and separates the − first-order diffracted light 65 diffracted through the light-branching diffraction element 55 in its state into the zero-order diffracted light 67a and the ± first-order diffracted lights 67b and 67c.

The second light detector 59, as illustrated in FIG. 6, includes light-receiving regions 59-1, 59-2 and 59-3. The main beam of the return light beam is such that the zero-order diffracted light 67a (ordinary light component corresponding to the polarized component in a direction of 45 degrees with respect to the x-axis direction) diffracted through the second polarization/separation element 57 passes through and falls on the light-receiving region 59-2. The + first-order diffracted light 67b and the − first-order diffracted light 67c diffracted through the second polarization/separation element 57, are collected on the light-receiving regions 59-1 and 59-3, respectively.

Here, in the case that the outputs of the light-receiving regions or the sums of the light-receiving regions 58-1, 58-2, 58-3, 58-4, {(58-5)+(58-6)}, {(58-7)+(58-8)}, 58-9, {(58-10)+(58-11)+(58-12)}, {(59-1)+(59-3)} and 59-2, are denoted by a, b, c, d, e, f, g, h, i and j, respectively, then, a focus error signal (FES) can be detected by calculating the formula (2) in compliance with a single knife edge method, $$FES = a - b \tag{2}$$

Further, a tracking error signal (TES) can be detected by calculating the formula (3) in compliance with, for example, a differential push-pull method. In the formula (3), the coefficient k denotes an intensity ratio of the main beam to the sub-beams.

$$TES = (c - d) - k(e - f) \tag{3}$$

A signal MO1 reproduced from the first magneto-optical recording medium is given by the formula (4), and a signal MO2 reproduced from the second magneto-optical recording medium of a standard different from the first magneto-optical recording medium is given by the formula (5), $$MO1 = (a + b + c + d + h) - g \tag{4}$$

$$MO2 = i - j \tag{5}$$

In the pickup 51 of this embodiment as described above, magneto-optical signals are reproduced by the first light detector 58 from the first magneto-optical recording medium while compensating the phase difference by the first phase compensation element 60, and magneto-optical signals are reproduced by the second light detector 59 from the second magneto-optical recording medium having a standard different from the first magneto-optical recording medium and steadily generating a phase difference in the return light while compensating the phase difference by the second phase compensation element 61.

Figure 7:
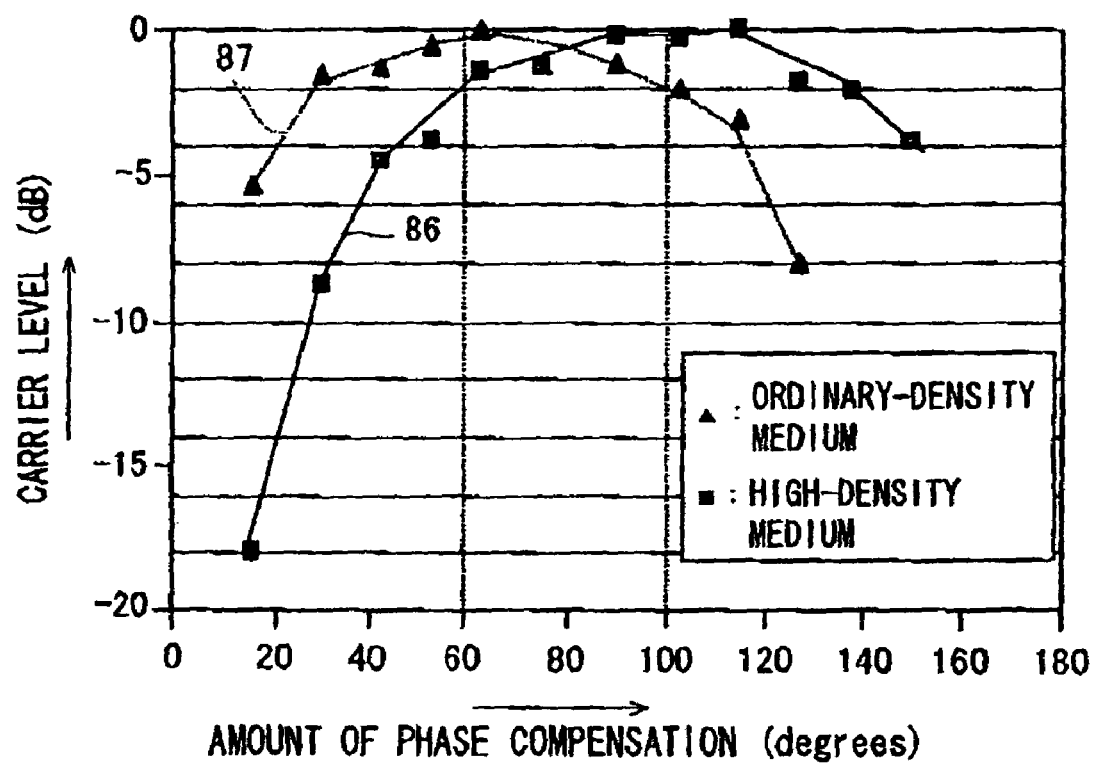
FIG. 7 is a diagram illustrating a relationship between an amount of phase compensation and a carrier level for the two kinds of magneto-optical recording media of different standards.

Described below is an example of compensating the phase differences for the two kinds of magneto-optical recording media of different standards by using two phase compensation elements. FIG. 7 is a diagram illustrating a relationship between the phase compensation amounts for the two kinds of magneto-optical recording media having different standards and a carrier level. The example illustrated in FIG. 7 employs a DWDD high-density medium having a high recording density as one magneto-optical recording medium and an ordinary-density MD (called ordinary-density medium for convenience) having a recording density lower than that of the DWDD high-density medium as another magneto-optical recording medium. As for the DWDD high-density medium, a relationship is found between the phase compensation amount and the carrier level of when the shortest mark is recorded by using a (1, 7) RLL (Run Length Limited) signal. As for the ordinary-density medium, a relationship is found between the phase compensation amount and the carrier level of when the shortest mark is recorded by using an EFM (Eight to Fourteen Modulation) signal.

The carrier level represents, in decibel (dB), a ratio of the carrier (signal amplitude) in the phase compensation amount selected as a reference and the carrier in the phase compensation amount increased or decreased from the reference amount. In FIG. 7, a line 86 connecting the black squares represents the results of the DWDD high-density medium, and a line 87 connecting the black triangles represents the results of the ordinary-density medium.

Referring to FIG. 7, the carrier level has a peak value for a particular phase compensation amounts and tends to decrease when the phase compensation amount increases or decreases relative to a particular phase compensation amount. A change in the carrier level accompanying the change in the phase compensation amount is basically expressed by a sine curve. A phase compensation amount with which the carrier level exhibits a peak value is an optimum phase compensation amount which is determined depending upon the kind of the magneto-optical recording medium, and can be found from a relationship between the phase compensation amount and the carrier level illustrated in FIG. 7. In the example of FIG. 7, in a laser wavelength of 780 nm, the high-density medium has 100 degrees and the ordinary-density medium has 60 degrees.

A phase compensation of 60 degrees which is an optimum phase compensation amount was given to the ordinary-density medium MD to evaluate the quality of the reproduced signals. As a result, the ROM type MD exhibited a jittering of 5% with the shortest mark and the rewritable MD exhibited a tittering of 10% with the shortest mark. These jittering values are signal qualities which do not at all impose problem on the recording/reproduction. Further, a phase compensation of 100 degrees which is an optimum phase compensation amount was given to the DWDD high-density medium to evaluate the ratio (C/N) of the carrier and the noise. As a result, the ratio of not smaller than 40 dB was obtained. The ratio C/N of not smaller than 40 dB is enough as a quality of signals. By providing two phase compensation elements having different phase compensation amounts as described above, it is allowed to give optimum phase compensation amounts to the ordinary-density medium MD and to the DWDD high-density medium of different standards. Thus, there is realized a pickup capable of recording and reproducing the two magneto-optical recording media maintaining a good signal quality.

Figure 8:
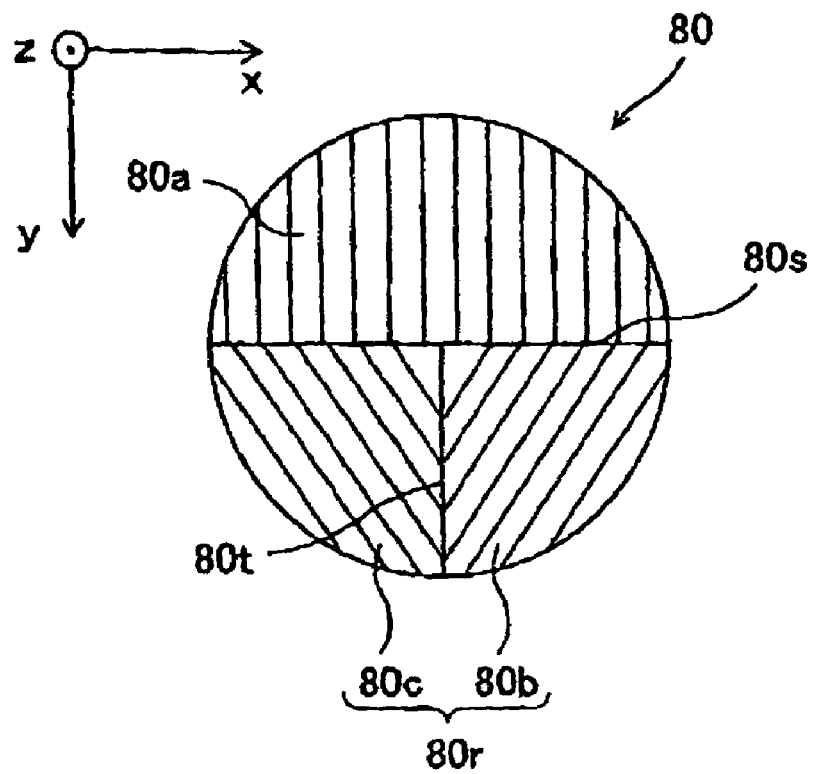
FIG. 8 is a plan view illustrating the constitution of a light-branching diffraction element provided for a pickup according to a second embodiment of the invention.
Figure 9:
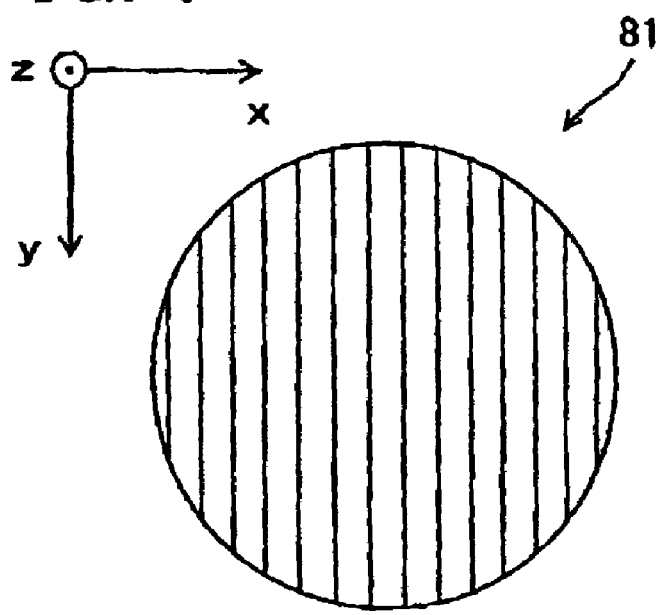
FIG. 9 is a plan view illustrating the constitution of a first polarization/separation element provided for the pickup according to the second embodiment of the invention.
Figure 10:
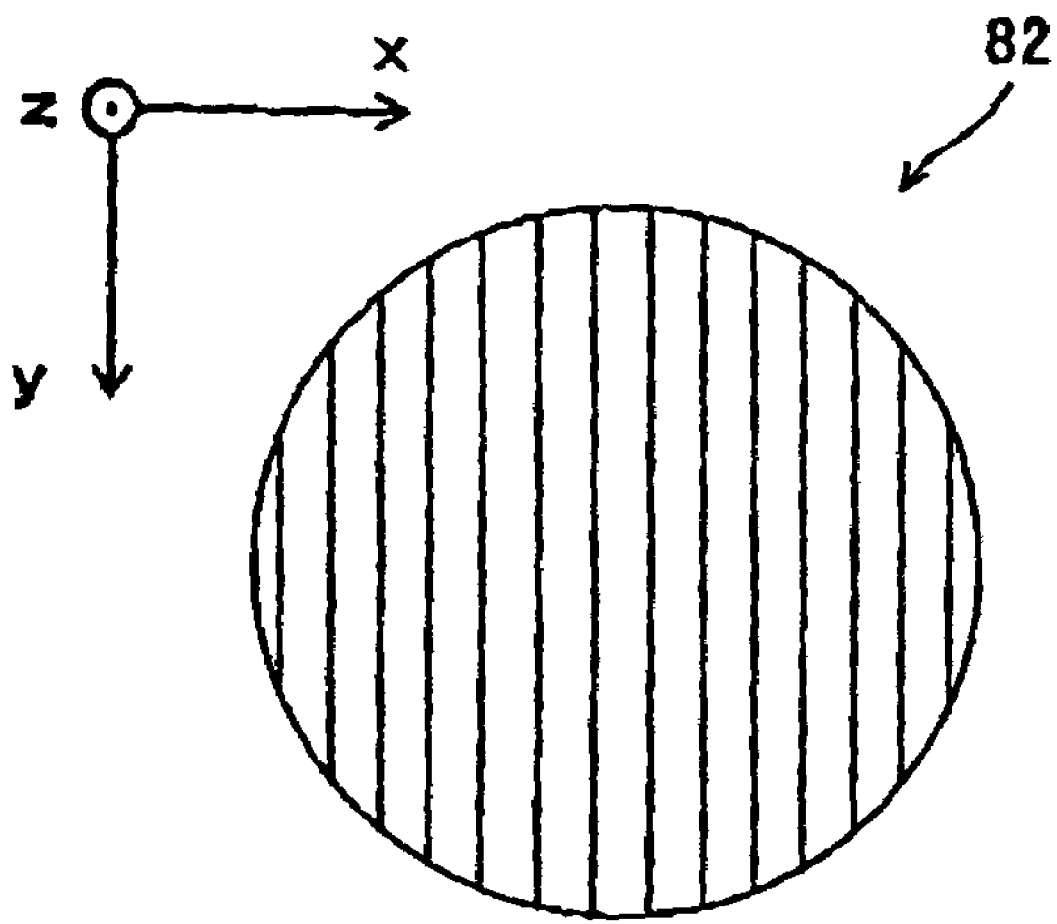
FIG. 10 is a plan view illustrating the constitution of a second polarization/separation element provided for the pickup according to the second embodiment of the invention.
Figure 11:
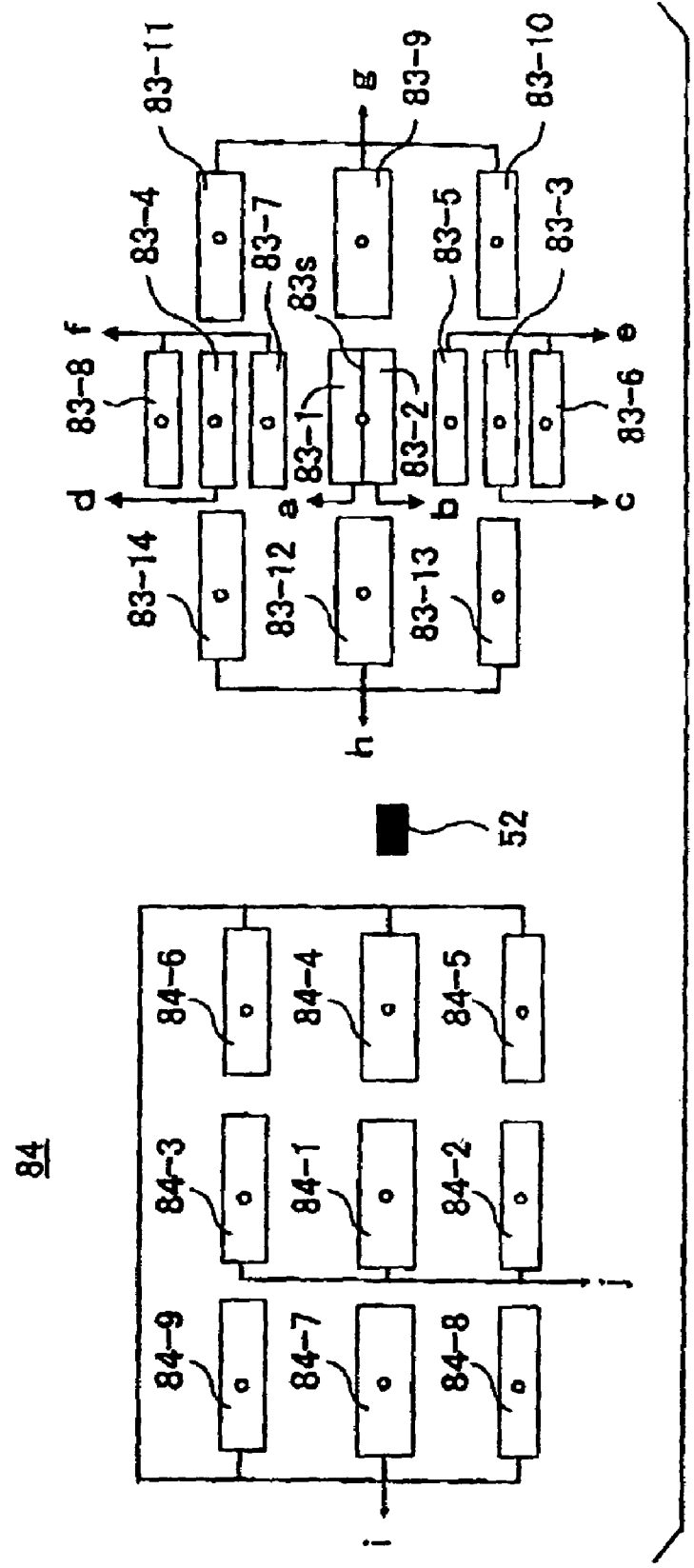
FIG. 11 is a plan view illustrating the constitution and arrangement of first and second light detectors provided for the pickup according to the second embodiment of the invention.

FIG. 8 is a plan view illustrating the constitution of a light-branching diffraction element 80 provided for a pickup according to a second embodiment of the invention, FIG. 9 is a plan view illustrating the constitution of a first polarization/separation element 81 provided for the pickup according to the second embodiment of the invention, FIG. 10 is a plan view illustrating the constitution of a second polarization/separation element 82 provided for the pickup according to the second embodiment of the invention, and FIG. 11 is a plan view illustrating the constitution and arrangement of the first and second light detectors 83 and 84 provided for the pickup according to the second embodiment of the invention.

The pickup of the second embodiment of the invention has the same constitution as that of the pickup 51 of the first embodiment of the invention except the light-branching diffraction element 80, first and second polarization/separation elements 81, 82, and first and second light detectors 83, 84. Therefore, an explanation concerning the constitution thereof is omitted here.

The light-branching diffraction element 80 and the first polarization/separation element 81 of this embodiment of the invention have split patterns different from those of the light-branching diffraction element 55 and the first polarization/separation element 56 of the first embodiment. Here, however, the second polarization/separation element 82 has the same constitution as that of the second polarization/separation element 57 of the first embodiment of the invention.

The light-branching diffraction element 80 of this embodiment is divided, by a split line 80s in parallel with the x-axis direction, into two, i.e., a first divided region 80a and a remaining portion 80r. The remaining portion 80r is further divided, by a split line 80t in parallel with the y-axis direction, into two, i.e., second and third divided regions 80b and 80c. The first polarization/separation element 81 is constituted without being divided. Described below is the detection of the magneto-optical signals reproduced by the pickup according to the second embodiment of the invention with reference to FIGS. 8 to 11.

The return light beam incident on the light-branching diffraction element 80 turns into ± first-order diffracted lights of which the wave surface is divided into three, and falls on the first and second polarization/separation means 81 and 82. The first and second polarization/separation elements 81 and 82 are constituted without being divided as described above. As illustrated in FIG. 11, further, the first light detector 83 includes a pair of two-split light-receiving regions 83-1 and 83-2, as well as other individual light-receiving regions 83-3, 83-4, 83-5, 83-6, 83-7, 83-8, 83-9, 83-10, 83-11, 83-12, 83-13 and 83-14.

Of the return light beam, the main beam turns into the + first-order diffracted light being diffracted by the first divided region 80a of the light-branching diffraction element 80, and zero-order diffracted light (ordinary light component corresponding to the polarized component in a direction of 45 degrees with respect to the x-axis direction) diffracted through the first polarization/separation element 81 passes through and, when being focused, is collected on the split line 83s extending in the x-axis direction of the two-split light-receiving regions 83-1 and 83-2. Of the + first-order diffracted light diffracted by the second and third divided regions 80b and 80c, the zero-order diffracted light diffracted through the first polarization/separation element 81 passes through and is collected on the light-receiving regions 83-3 and 83-4.

The two sub-beams are such that of the + first-order diffracted light diffracted by the second divided region 80b of the light-branching diffraction element 80, the zero-order diffracted light through the first polarization/separation element 81 directly passes through and is collected on the light-receiving regions 83-5 and 83-6. Of the + first-order diffracted light diffracted by the third divided region 80c, the zero-order diffracted light through the first polarization/separation element 81 passes through and is collected on the light-receiving regions 83-7 and 83-8.

Further, the main beam turns into the + first-order diffracted light being diffracted by the first divided region 80a of the light-branching diffraction element 80, and in which the ± first-order diffracted lights (extraordinary light component corresponding to the polarized component in a direction of −45 degrees with respect to the x-axis direction) diffracted through the first polarization/separation element 81 are diffracted and are collected on the light-receiving regions 83-9 and 83-12, respectively. Of the + first-order diffracted light diffracted by the second divided region 80b, the ± first-order diffracted lights (extraordinary light component corresponding to the polarized component in a direction of −45 degrees with respect to the x-axis direction) diffracted through the first polarization/separation element 81 are diffracted and are collected on light-receiving regions 83-10 and 83-13, respectively. Of the + first-order diffracted light diffracted by the third divided region 80c, the ± first-order diffracted lights (extraordinary light component corresponding to the polarized component in a direction of −45 degrees with respect to the x-axis direction) diffracted through the first polarization/separation element 81 are diffracted and are collected on the light-receiving regions 83-11 and 83-14.

The second light detector 84 includes, as illustrated in FIG. 11, light-receiving regions 84-1, 84-2, 84-3, 84-4, 84-5, 84-6, 84-7, 84-8 and 84-9.

The main beam turns into the − first-order diffracted light being diffracted by the first divided region 80a of the light-branching diffraction element 80, and in which the zero-order diffracted light (ordinary light component corresponding to the polarized component in a direction of 45 degrees with respect to the x-axis direction) diffracted through the second polarization/separation element 82 passes through and is collected on the light-receiving region 84-1. Of the – first-order diffracted light diffracted by the second and third divided regions 80b and 80c, the zero-order diffracted light diffracted by the second polarization/separation element 82 passes through and is collected on the light-receiving regions 84-2 and 84-3. Further, the main beam turns into the – first-order diffracted light being diffracted by the first divided region 80a of the light-branching diffraction element 80, and in which the ± first-order diffracted lights (extraordinary light component corresponding to the polarized component in a direction of –45 degrees with respect to the x-axis direction) diffracted through the second polarization/separation element 82 are diffracted and are collected on the light-receiving regions 84-4 and 84-7, respectively.

Of the – first-order diffracted light diffracted by the second divided region 80b of the light-branching diffraction element 80, the ± first-order diffracted lights (extraordinary light component corresponding to the polarized component in a direction of –45 degrees with respect to the x-axis direction) diffracted through the second polarization/separation element 82 are diffracted and are collected on the light-receiving regions 84-5 and 84-8, respectively. Further, of the – first-order diffracted light diffracted by the third divided region 80c of the light-branching diffraction element 80, the ± first-order diffracted lights (extraordinary light component corresponding to the polarized component in a direction of –45 degrees with respect to the x-axis direction) diffracted through the second polarization/separation element 82 are diffracted and are collected on the light-receiving regions 84-6 and 84-9, respectively.

Here, in the case that the outputs of the light-receiving regions or the sums of the light-receiving regions 83-1, 83-2, 83-3, 83-4, {(83-5)+(83-6)}, {(83-7)+(83-8)}, {(83-9)+(83-10)+(83-11)}, {(83-12)+(83-13)+(83-14)}, {(84-4)+(84-5)+(84-6)+(84-7)+(84-8)+(84-9)} and {(84-1)+(84-2)+(84-3)}, are denoted by a, b, c, d, e, f, g, h, i and j, respectively, then, a FES can be detected by calculating the formula (6) in compliance with the single knife edge method, $$FES = a - b \qquad (6)$$

Further, a TES can be detected by calculating the formula (7) in compliance with, for example, the differential push-pull method. In the formula (7), the coefficient k denotes an intensity ratio of the main beam to the sub-beams.

$$TES = (c-d) - k(e-f) \qquad (7)$$

A signal MO1 reproduced from the first magneto-optical recording medium is given by the formula (8), and a signal MO2 reproduced from the second magneto-optical recording medium of a standard different from the first magneto-optical recording medium is given by the formula (9), $$MO1 = (a+b+c+d+h) - g \qquad (8)$$

$$MO2 = i - j \qquad (9)$$

In the pickup of this embodiment, light falling on the light-receiving regions 83-1 to 83-8 for detecting FES and TES is the zero-order diffracted light that has passed through the first polarization/separation element 81, of the + first-order diffracted light through the light-branching diffraction element 80. Even in case the wavelength of the semiconductor laser 52 has fluctuated, therefore, the pickup of the embodiment is not affected by a change in the diffraction angle of the first polarization/separation element 81.

Figure 12:
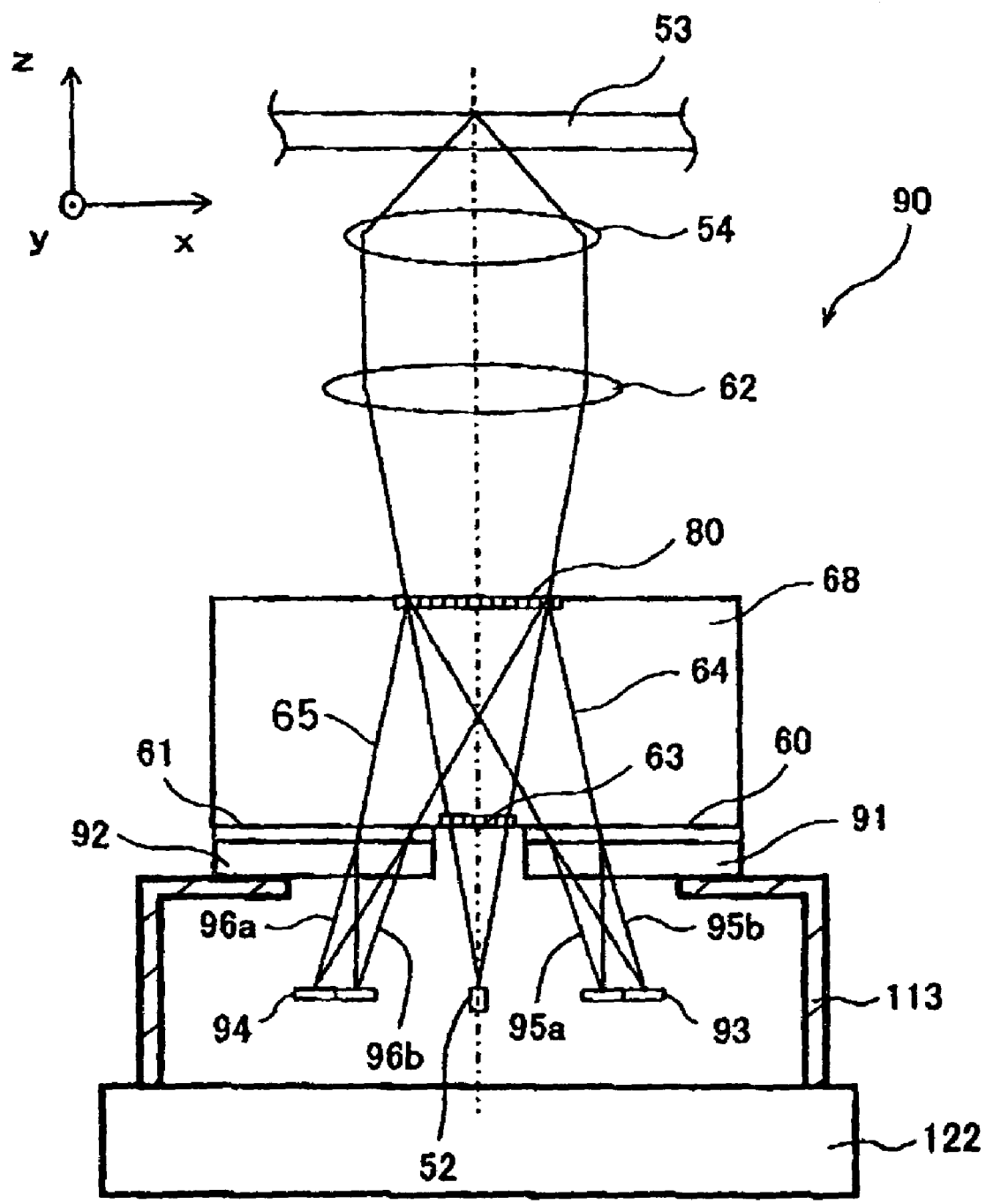
FIG. 12 is a side view of an arrangement illustrating, in a simplified manner, the constitution of a pickup according to a third embodiment of the invention.

FIG. 12 is a side view of an arrangement illustrating, in a simplified manner, the constitution of a pickup 90 according to a third embodiment of the invention, and FIG. 13 is a plan view illustrating the constitution of the first and second light detectors 93 and 94 provided for the pickup 90 illustrated in FIG. 12. The pickup 90 of this embodiment resembles the pickup 51 of the first embodiment of the invention, and the corresponding portions are denoted by the same reference numerals, and their explanation is omitted.

The pickup 90 of this embodiment draws attention with respect to that the first and second polarization/separation elements 91 and 92 are made of biaxial birefringent crystalline substrates. Referring to FIG. 12, the first and second polarization/separation elements 91 and 92 made of the birefringent crystalline substrates are secured to the surface of the transparent substrate 68 facing the semiconductor laser 52 at positions closer to the semiconductor laser 52 than the first and second phase compensation elements 60 and 61 via the first and second phase compensation elements 60 and 61. The optical axes of crystals of the birefringent crystalline substrates forming the first and the second polarization/separation elements 91 and 92 are so arranged as to be at angles of 45 degrees with respect to the direction in which is polarized the light beam emitted from the semiconductor laser 52. Relying upon the difference in the refractive indexes, the first and second polarization/separation elements 91 and 92 are capable of polarizing and separating ordinary light (polarized in a direction of an angle of 45 degrees with respect to the x-axis direction) and extraordinary light (polarized in a direction of an angle of –45 degrees with respect to the x-axis direction) into different directions, Described below is the detection of the magneto-optical signals reproduced by the pickup 90 according to the third embodiment of the invention. The light-branching diffraction element 80 is a polarizing hologram which is constituted being divided into three like the one described above with reference to FIG. 8. The first light detector 93 includes a pair of two-split light-receiving regions 93-1 and 93-2, as well as other individual light-receiving regions 93-3, 93-4, 93-5, 93-6, 93-7, 93-9, 93-9, 93-10 and 93-11.

The main beam is such that of the + first-order diffracted light being diffracted by the first divided region 80a of the light-branching diffraction element 80, the ordinary light 95a (corresponding to the polarized component in a direction of 45 degrees with respect to the x-axis direction) separated through the first polarization/separation element 91 and being focused, is collected on the split line 93s extending in the x-axis direction of the two-split light-receiving regions 93-1 and 93-2. Of the + first-order diffracted light diffracted by the second and third divided regions 80b and 80c, the ordinary light 95a diffracted through the first polarization/separation element 91 is collected on the light-receiving regions 93-3 and 93-4.

The two sub-beams are such that of the + first-order diffracted light diffracted by the second divided region 80b, the ordinary light 95a separated by the first polarization/separation element 91 is collected on the light-receiving regions 93-5 and 93-6. Of the + first-order diffracted light diffracted by the third divided region 80c, the ordinary light 95a separated by the first polarization/separation element 91 is collected on the light-receiving regions 93-7 and 93-8.

Further, the main beam turns into the + first-order diffracted light being diffracted by the first divided region 80a of the light-branching diffraction element 80, and in which the extraordinary light 95b (polarized component in a direction of −45 degrees with respect to the x-axis direction) separated by the first polarization/separation element 91 is collected on the light-receiving region 93-9. Of the + first-order diffracted light diffracted by the second divided region 80b of the light-branching diffraction element 80, the extraordinary light 95b (polarized component in a direction of −45 degrees with respect to the x-axis direction) separated by the first polarization/separation element 91 is diffracted and is collected on the light-receiving region 93-10. Of the + first-order diffracted light diffracted by the third divided region 80c of the light-branching diffraction element 80, the extraordinary light 95b (polarized component in a direction of −45 degrees with respect to the x-axis direction) separated by the first polarization/separation element 91 is collected on the light-receiving region 93-11.

The second light detector 94 includes, as illustrated in FIG. 13, light-receiving regions 94-1, 94-2, 94-3, 94-4, 94-5 and 94-6. The main beam turns into the − first-order diffracted light being diffracted by the first divided region 80a of the light-branching diffraction element 80, and in which the ordinary light 96a (polarized component in a direction of 45 degrees with respect to the x-axis direction) separated by the second polarization/separation element 92 is collected on light-receiving region 94-1. Of the − first-order diffracted light diffracted by the second and third divided regions 80b and 80c, the ordinary light 96a (polarized component in a direction of 45 degrees with respect to the x-axis direction) separated by the second polarization/separation element 92 is collected on the light-receiving regions 94-2 and 94-3, respectively.

Further, the main beam turns into the − first-order diffracted light being diffracted by the first divided region 80a of the light-branching diffraction element 80, and in which the extraordinary light 96b (corresponding to the polarized component in a direction of −45 degrees with respect to the x-axis direction) separated by the second polarization/separation element 92 is diffracted and is collected on the light-receiving region 94-4. Of the − first-order diffracted light diffracted by the second divided region 80b of the light-branching diffraction element 60, the extraordinary light 96b (polarized component in a direction of −45 degrees with respect to the x-axis direction) separated by the second polarization/separation element 92 is diffracted and is collected on the light-receiving region 94-5. Of the − first-order diffracted light diffracted by the third divided region 80c of the light-branching diffraction element 80, the extraordinary light 96b (polarized component in a direction of −45 degrees with respect to the x-axis direction) separated by the second polarization/separation element 92 is diffracted and is collected on the light-receiving region 94-6.

Here, in the case that the outputs of the light-receiving regions or the sums of the light-receiving regions 93-1, 93-2, 93-3, 93-4, {(93-5)+(93-6)}, {(93-7)+(93-8)}, {(93-9)+(93-10)+(93-11)}, {(94-4)+(94-5)+(94-6)} and {(94-1)+(94-2)+(94-3)}, are denoted by a, b, c, d, e, f, g, i and J, respectively, then, a FES can be detected by calculating the formula (10) in compliance with the single knife edge method, $$FES = a - b \quad (10)$$

Further, a TES can be detected by calculating the formula (11) in compliance with, for example, the differential push-pull method. In the formula (11), the coefficient k denotes an intensity ratio of the main beam to the sub-beams.

$$TES = (c-d) - k(e-f) \quad (11)$$

A signal MO1 reproduced from the first magneto-optical recording medium is given by the formula (12), and a signal MO2 reproduced from the second magneto-optical recording medium of a standard different from the first magneto-optical recording medium is given by the formula (13), $$MO1 = (a+b+c+d) - g \quad (12)$$

$$MO2 = i - j \quad (13)$$

In this embodiment, the number of dividing the light-receiving regions of the first and second light detectors 93 and 94 can be decreased. Besides, simple birefringent crystalline substrates are used as the first and second polarization/separation elements 91 and 92 making it possible to decrease the cost of production as compared to when the polarizing holograms are used. By using the birefringent crystalline substrate as the first and second polarization/separation elements 91 and 92, further, the polarization/separation characteristics are little deteriorated even in case the wavelength of the semiconductor laser 52 has fluctuated, and high reliability is maintained.

Figure 14:
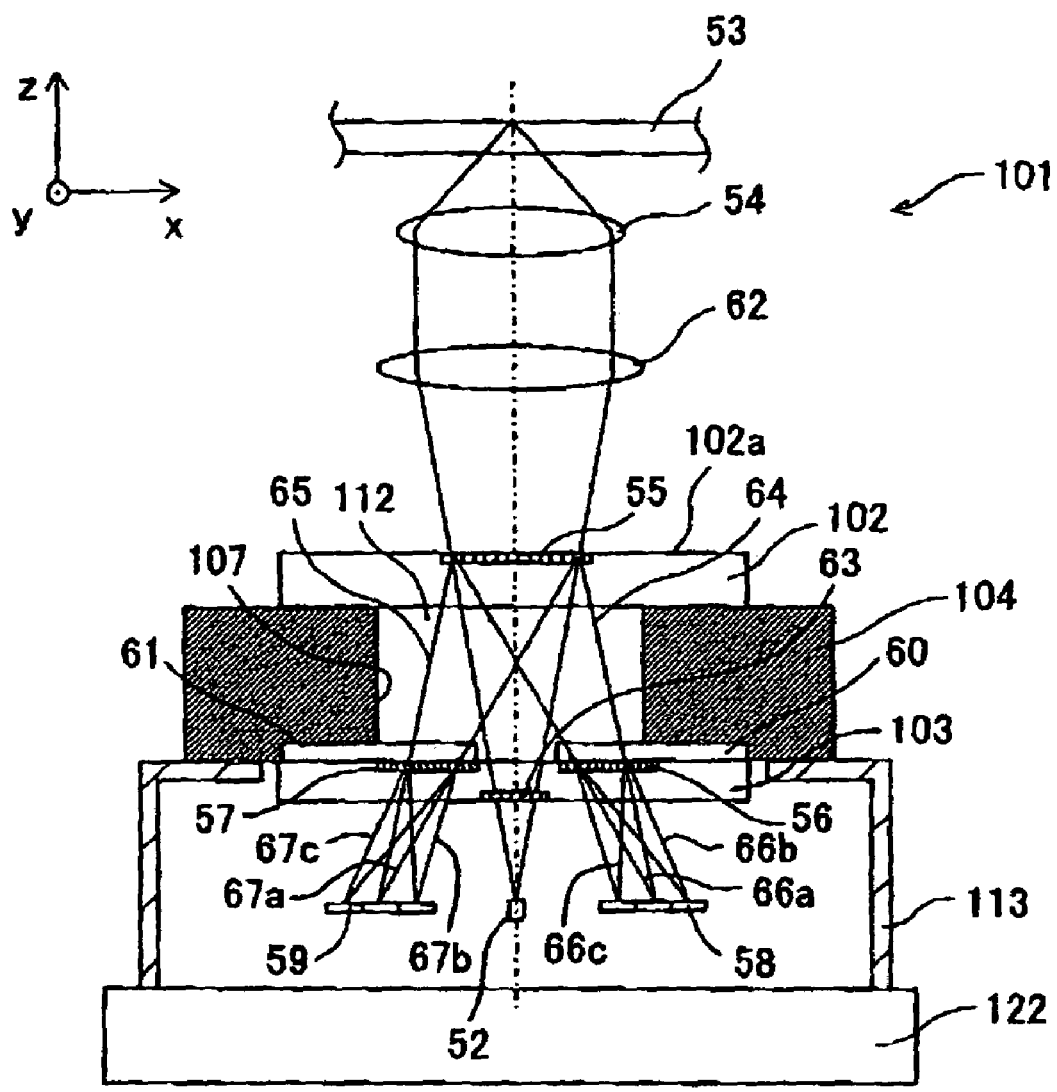
FIG. 14 is a side view of an arrangement illustrating, in a simplified manner, the constitution of a pickup according to a fourth embodiment of the invention.
Figure 15:
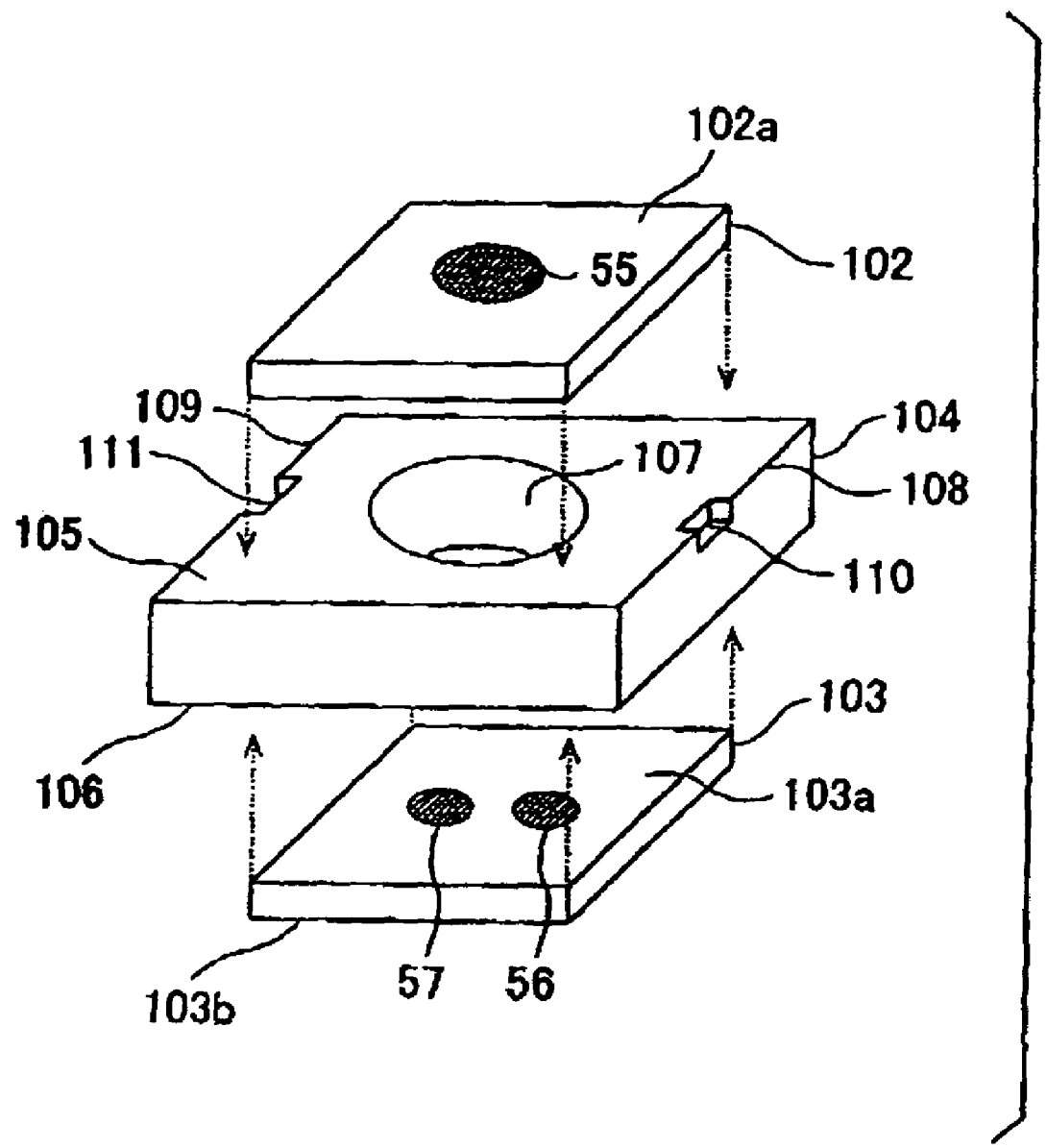
FIG. 15 is a perspective view illustrating the constitution of members provided with the light-branching diffraction element and with the first and second polarization/separation elements in the pickup illustrated in FIG. 14.

FIG. 14 is a side view of an arrangement illustrating, in a simplified manner, the constitution of a pickup 101 according to a fourth embodiment of the invention, and FIG. 15 is a perspective view illustrating the constitution of the members on which are provided the light-branching diffraction element 55, and the first and second polarization/separation elements 56 and 57 in the pickup 101 illustrated in FIG. 14. The pickup 101 of this embodiment resembles the pickup 51 of the first embodiment of the invention and, hence, the corresponding portions are denoted by the same reference numerals and their explanation is omitted. The pickup 101 has a feature in the constitution of mounting the light-branching diffraction element 55, and the first and second polarization/separation elements 56 and 57.

The pickup 101 of this embodiment further includes a first transparent substrate 102, a second transparent substrate 103, and a holding substrate 104 for holding the first and second transparent substrates 102 and 103. The first and second transparent substrates 102 and 103 are flat plate members of a flat rectangular shape, and are made of a glass material such as quartz or sodalime-glass, or a plastic material such as acrylic resin. The holding substrate 104 is a member of a rectangular parallelepiped shape made of a metal such as aluminum or a resin such as ABS, and has a through hole 107 penetrating from one surface thereof, or in this embodiment, from the surface 105 facing the collimator lens 62 or the objective lens 54 up to the other surface, or in this embodiment, up to the surface 106 facing the light source 52. The holding substrate 104 has first and second cut-away portions 110 and 111 formed in two sides 108 and 109 facing each other in a direction in which is polarized the light emitted from the light source 52 or in the X-direction, in this case, the first and second cut-away portions 110 and 111 being formed at the corners of the two sides 108 and 109 nearly at the centers thereof.

The light-branching diffraction element 55 is provided on an upper surface 102a of the first transparent substrate 102. The first polarization/separation element 56 and the second polarization/separation element 57 are provided on an upper surface 103a of the second transparent substrate 103. The grating 63 for three beams is provided on a lower surface 103b of the second transparent substrate 103 to separate the light emitted from the light source 52 into three beams, i.e., a main beam and two sub-beams. The first transparent substrate 102 provided with the light-branching diffraction element 55 is mounted on one surface 105 of the holding substrate 104, and the second transparent substrate 103 is mounted on another surface 106 of the holding substrate 104, whereby the light-branching diffraction element 55, first and second polarization/separation elements 56 and 57, and grating 63, constitute an integrated member via the first and second transparent substrates 102 and 103, and via the holding substrate 104. The integrated member includes the first and second phase compensation elements 60 and 61 mounted between the holding substrate 104 and the second transparent substrate 103.

When the integrated member is mounted on the pickup 101, the through hole 107 formed in the holding substrate 104 is positioned between the light-branching diffraction element 55 and the first and second polarization/separation element 56 and 57, thereby to form an air layer 112 permitting the passage of the reflected light from the light-branching diffraction element 55 to the first and second polarization/separation elements 56 and 57. By forming the air layer 112 in the region where the reflected light passes from the light-branching diffraction element 55 to the first and second polarization/separation elements 56 and 57, it is allowed to increase the air conversion length (distance/refractive index) between the light-branching diffraction element 55 and the first and second polarization/separation elements 56 and 57 as compared to the case of the absence of the air layer 112, for example, the case of a glass substrate layer.

In the pickup, the first polarization/separation element 56 and the second polarization/separation element 57 must be separately arranged, so that the reflected light is diffracted by the light-branching diffraction element 55, but that the + first-order diffracted light 64 heading to the first polarization/separation element 56 and the − first-order diffracted light 65 heading to the second polarization/separation elements 57 will not interfere with the beam emitted from the light source 52, i.e., so that the light paths of the ± first-order diffracted lights 64 and 65 will not overlap the light path of the emitted beam.

In order for the light paths of the ± first-order diffracted lights 64 and 65 not to overlap the light path of the emitted beam, it can be contrived to increase the angle of diffraction of the + first-order diffracted light 64 and the − first-order diffracted light 65 by the light-branching diffraction element 55, or to increase the distance between the light-branching diffraction element 55 and the first and second polarization/separation elements 56 and 57. To increase the angle of diffraction of the light-branching diffraction element 55, however, the pitch of the grating (grooves) of the light-branching diffraction element 55 must be decreased causing the production to become difficult and the cost to increase. To increase the distance between the light-branching diffraction element 55 and the first and second polarization/separation elements 56 and 57, the height of the integrated unit as a whole must be increased causing the apparatus to become bulky.

The air layer 112 for passing the reflected light from the light-branching diffraction element 55 to the first and second polarization/separation elements 56 and 57, is formed relying upon a structure in which the holding substrate 104 forming the through hole 107 is provided, and there are mounted, on both sides thereof, the first transparent substrate 102 provided with the light-branching diffraction element 55, and the second transparent substrate 103 provided with the first and second polarization/separation elements 56, 57 and with the grating 63, as in the pickup 101. This makes it possible to substantially shorten the distance between the light-branching diffraction element 55 and the first and second polarization/separation elements 56 and 57, i.e., to decrease the height in the direction of the optical axis, though the air conversion length is large and, hence, to realize the apparatus in a small size and in a decreased thickness.

In the pickup 101 of this embodiment, further, recessed portions are formed in the other surface 106 of the holding substrate 104 to meet the thickness of the first and second phase compensation element 60 and 61, the first and second phase compensation elements 60 and 61 are fitted into the recessed portions, and then the second transparent substrate 103 can be mounted on the holding substrate 104. Therefore, even when the first phase compensation element 60 and the second phase compensation element 61 have different thicknesses, the second transparent substrate 103 can be mounted on the holding substrate 104 without causing a problem such as inclination.

In the pickup 101 of this embodiment, further, the first and second polarization/separation elements 56 and 57 are provided on the upper surface 103a of the second transparent substrate 103, and the grating 63 is provided on the lower surface 103b in order to decrease the number of parts at the time of assembling and to improve positioning precision between the grating 63 and the first and second polarization/separation elements 56 and 57. Further, the first polarization/separation element 56 and the second polarization/separation element 57 have the same polarization characteristics (diffraction efficiency) and may have grooves of the same depth. Therefore, they can be simultaneously formed by using the same substrate.

The first transparent substrate 102 and the second transparent substrate 103 are correctly positioned and adjusted relative to the holding substrate 104, and are adhered thereto. Then, the whole of first and second transparent substrates 102 and 103, and the holding substrate 104 which are integrated together, are moved on the cap 113 to adjust the positions in the x-direction and/or the y-direction and to adjust the rotation with the optical axis (z-direction) as a center. This makes it possible to simultaneously adjust the positioning for the light-branching diffraction element 55, first and second phase compensation elements 60 and 61, first and second polarization/separation elements 56 and 57, grating 63, light source 52, and first and second light detectors 58 and 59. It is further allowed to move, on the first and second light detectors 58 and 59 and in the y-direction, the positions for receiving the + first-order diffracted light 64 and the − first-order diffracted light 65 diffracted by the light-branching diffraction element 55. That is, the light-receiving positions can be moved in a vertical direction relative to the split line in the two-divided light-receiving regions for detecting FES making it easy to adjust the offset of FES.

By forming the first and second cut-away portions 110 and 111 in the holding substrate 104, further, the whole of the first and second transparent substrates 102 and 103 and the holding substrate 104 integrated together, can be easily held at the time of handling and adjustment.

Figure 16:
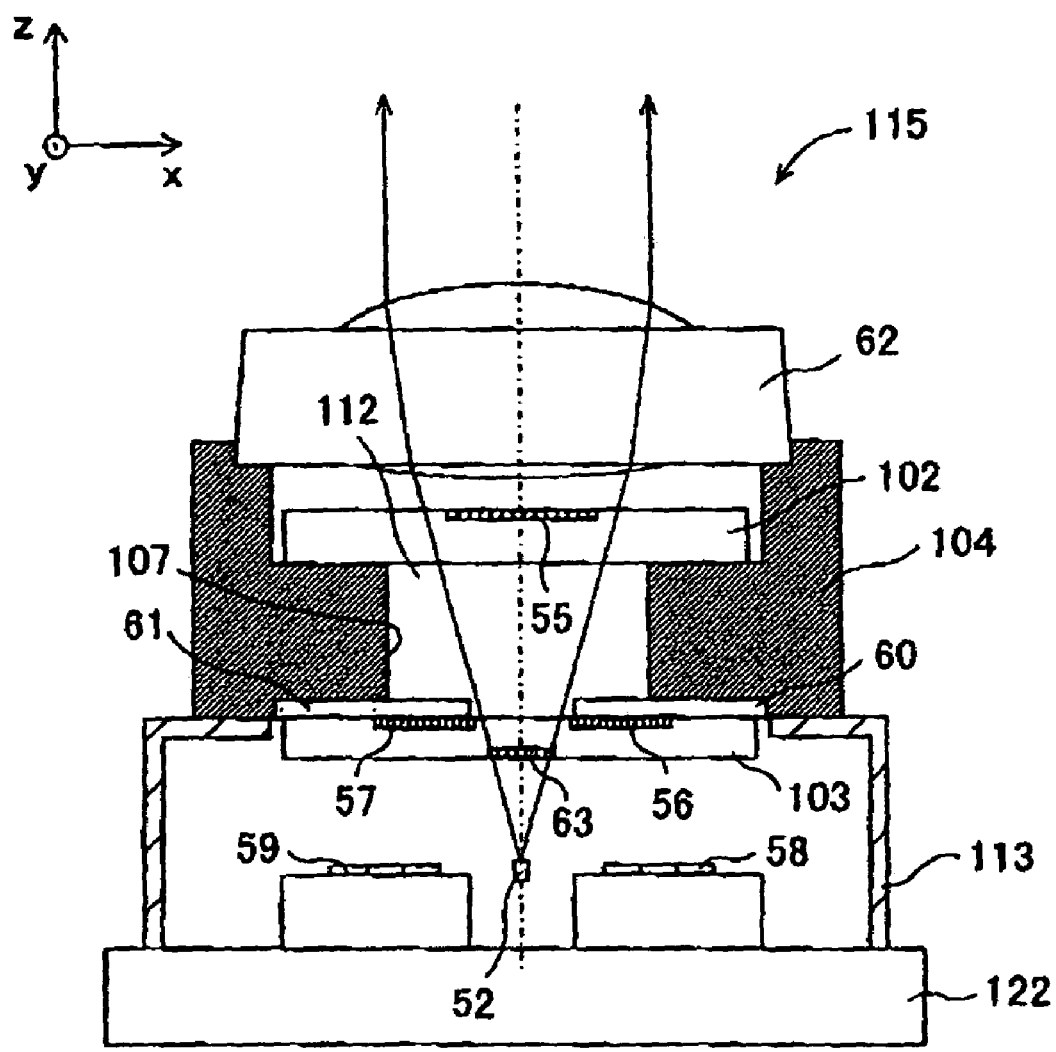
FIG. 16 is a side view of an arrangement illustrating, in a simplified manner, the constitution of a major portion of a pickup according to a fifth embodiment of the invention.

FIG. 16 is a side view of an arrangement illustrating, in a simplified manner, the constitution of a major portion of a pickup 115 according to a fifth embodiment of the invention. The pickup 115 of this embodiment resembles the pickup 101 of the fourth embodiment of the invention, and the corresponding portions are denoted by the same reference numerals and their explanation is omitted.

The pickup 115 draws attention with respect to that the collimator lens 62 is arranged closer to the objective lens 54 than the first transparent substrate 102, and is mounted on the holding substrate 104 together with the first and second transparent substrates 102, 103, holding substrate 104, light-branching diffraction element 55, first and second phase compensation elements 60 and 61, first and second polarization/separation elements 56 and 57, and grating 63 so as to constitute an integrated member. Owing to this constitution, there is no need of newly providing a holder or a holding portion for the collimator lens 62 in the housing of the pickup 115, offering advantage for decreasing the size and for simplifying the structure. It is further made possible to more correctly position the collimator lens 62 with respect to the light source 52.

Figure 17:
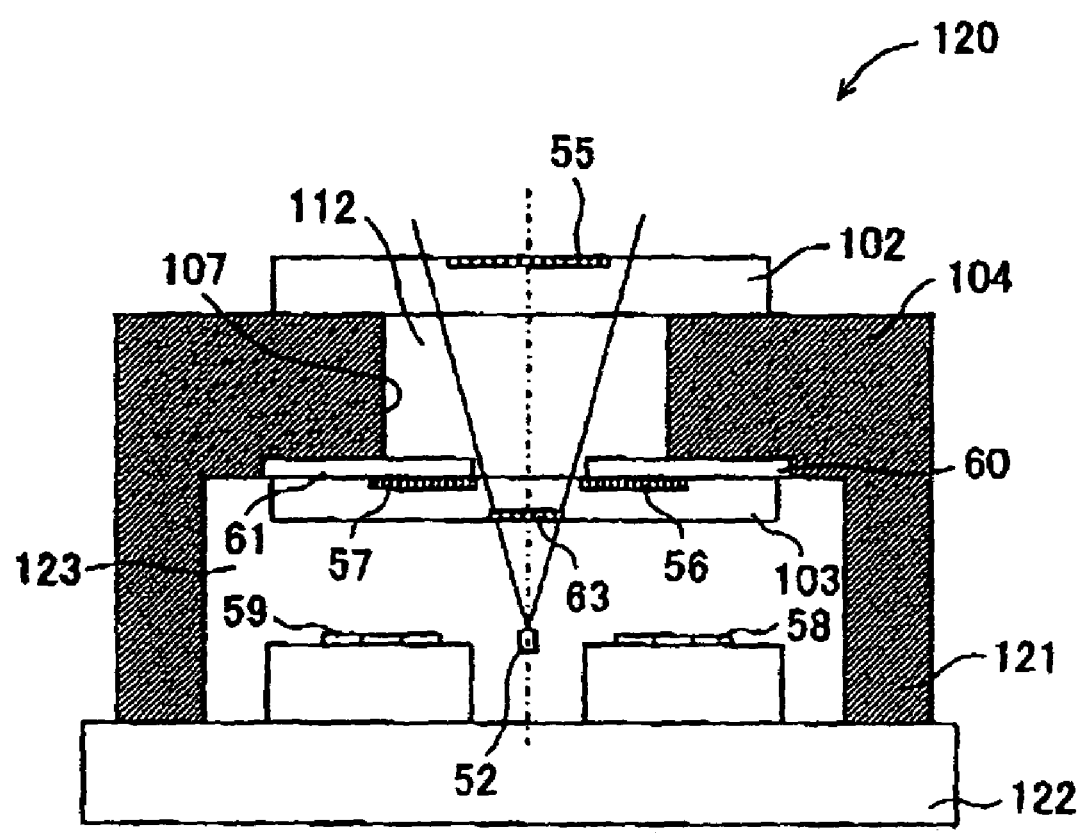
FIG. 17 is a side view of an arrangement illustrating, in a simplified manner, the constitution of a major portion of a pickup according to a sixth embodiment of the invention.
Figure 18:
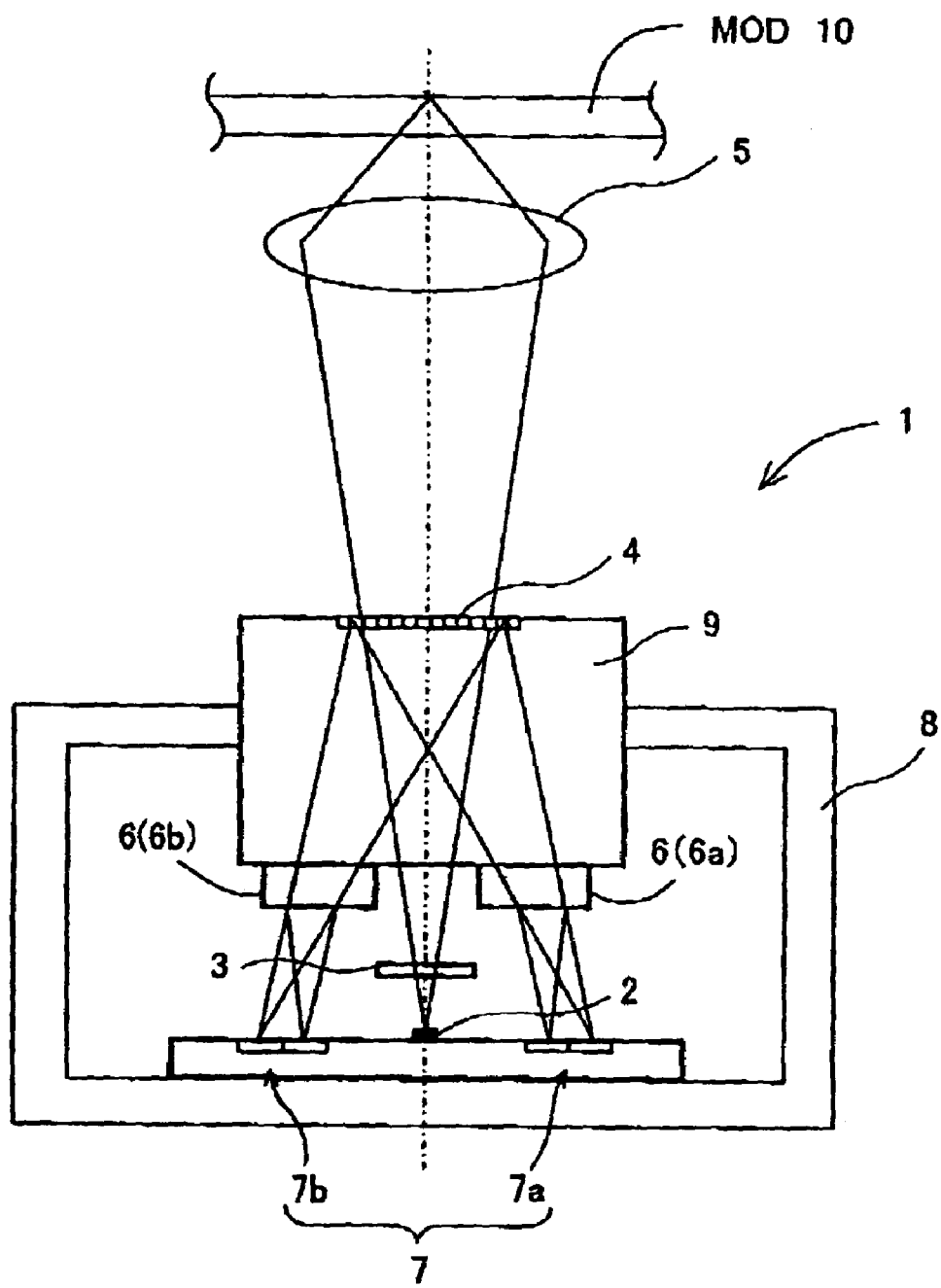
FIG. 18 is a side view of an arrangement illustrating, in a simplified manner, the constitution of an optical pickup according to a related art.
Figure 19:
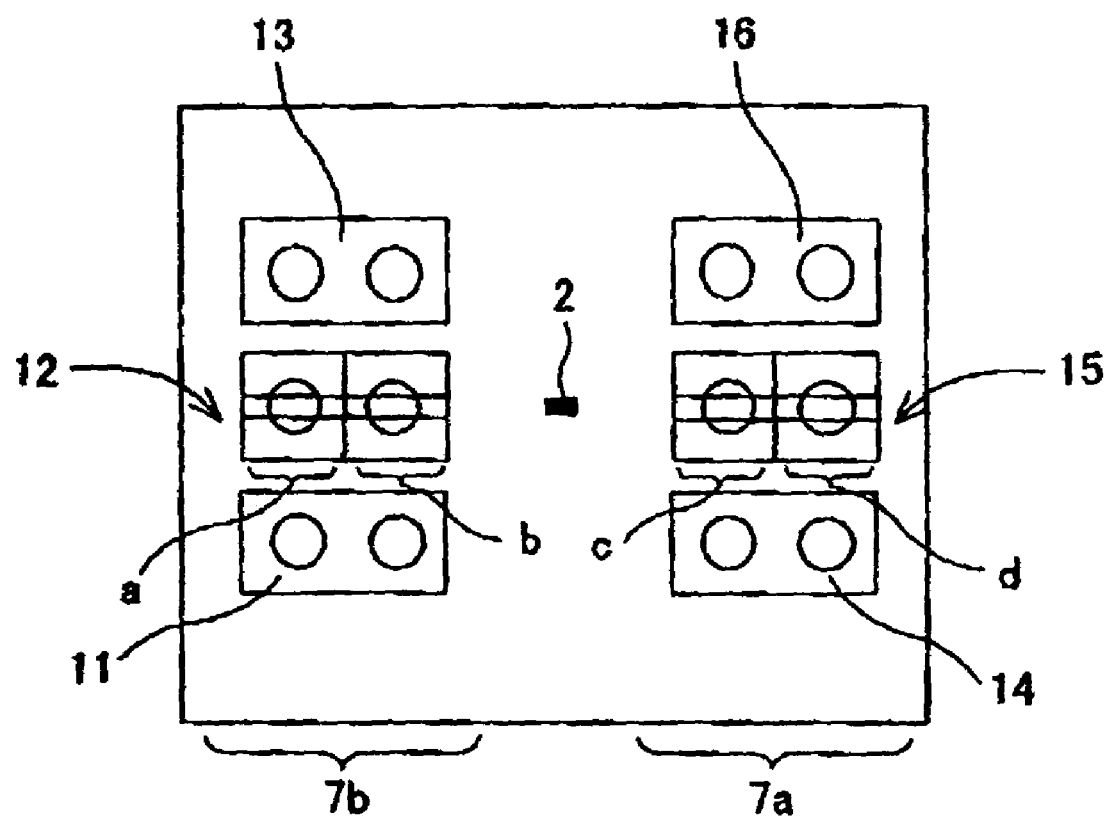
FIG. 19 is a plan view of an arrangement illustrating a light detector provided for the optical pickup illustrated in FIG. 18.

FIG. 17 is a side view of an arrangement illustrating, in a simplified manner, the constitution of a major portion of a pickup 120 according to a sixth embodiment of the invention. The pickup 120 of this embodiment resembles the pickup 101 of the fourth embodiment of the invention, and the corresponding portions are denoted by the same reference numerals and their explanation is omitted.

The pickup 120 draws attention with respect to that the holding substrate 104 constitutes a casing 121 that accommodates the light source 52, and the first and second light detectors 58 and 59. The holding substrate 104 of this embodiment has a leg 121 that constitutes the casing 121 and is extending toward the light source 52 from the peripheral edges thereof, the leg 121 being erected on the substrate member 122. Therefore, the holding substrate 104 accommodates the light source 52, and the first and second light detectors 58 and 59 in an internal space 123 formed by the holding substrate 104 and by the leg 121. That is, the leg 121 of the holding substrate 104 exhibits a function that substitutes for the above cap 113. This makes it possible to decrease the number of parts, to enhance the operation efficiency in the step of assembling the apparatus, to remove the effect of tolerance for the height of the cap and, hence, to decrease the overall assembling error.

In this embodiment as described above, the light-branching diffraction element is a polarizing hologram of a constitution in which grooves are formed in an optically anisotropic polymer layer that is obtained by polymerizing a liquid crystalline monomer oriented on the glass substrate by the irradiation with an ultraviolet ray, and the grooves are filled with a photopolymer of an isotropic material. Not being limited thereto only, however, the light-branching diffraction element may be a polarizing hologram of a constitution in which a grating is formed on a substrate of, for example, lithium niobate by a proton-exchange method using a benzoic acid, or a polarizing hologram of a constitution forming a structural birefringent diffraction grating of a fine structure having a pitch of rugged grooves smaller than the wavelength of light.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A pickup for a magneto-optical recording medium for recording information into a magneto-optical recording medium and/or reproducing information from a magneto-optical recording medium, comprising:
   a light source for emitting light;
   an objective lens for collecting light emitted from the light source onto an information recording surface of a magneto-optical recording medium;
   a light-branching diffraction element provided between the light source and the objective lens for diffracting light reflected by the magneto-optical recording medium that has passed through the objective lens;
   first and second polarization/separation elements for polarizing and separating + first-order diffracted light and − first-order diffracted light that are diffracted through the light-branching diffraction element, respectively;
   first and second light detectors for receiving and detecting light separated by the first and second polarization/separation elements, respectively;
   a first phase compensation element provided on the optical passage of the + first-order diffracted light between the light-branching diffraction element and the first polarization/separation element; and
   a second phase compensation element provided on the optical passage of the − first-order diffracted light between the light-branching diffraction element and the second polarization/separation element,
   wherein an amount of phase compensation for the + first-order diffracted light of the first phase compensation element is different from an amount of phase compensation for the − first-order diffracted light of the second phase compensation element, according to two kinds of magneto-optical recording mediums which have different recording film structures.

2. The pickup of claim 1, wherein the magneto-optical recording medium includes a first magneto-optical recording medium and a second magneto-optical recording medium which have different recording film structures,
   the first phase compensation element has an amount of phase compensation corresponding to reproduced signals from the first magneto-optical recording medium, and
   the second phase compensation element has an amount of phase compensation corresponding to reproduced signals from the second magneto-optical recording medium.

3. The pickup of claim 1, wherein the light-branching diffraction element is a polarizing diffraction element having a function for amplifying Kerr rotation angle.

4. The pickup of claim 3, wherein
   (a) the polarizing diffraction element is made of a material having an ordinary light refractive index no and an extraordinary light refractive index ne,
   (b) the polarizing diffraction element has a plurality of grooves formed in at least one surface thereof, and
   (c) the polarizing diffraction element has an isotropic material filled in the plurality of grooves, the isotropic material having a refractive index na different from the ordinary light refractive index no and from the extraordinary light refractive index ne.

5. The pickup of claim 1, wherein the first and second polarization/separation elements are polarizing diffraction elements.

6. The pickup of claim 5, wherein at least either one of the first polarization/separation element or the second polarization/separation element is divided into a plurality of regions having different groove structures.

7. The pickup of claim 1, wherein the first and second polarization/separation elements are birefringent crystalline substrates.

8. The pickup of claim 1, wherein the light-branching diffraction element is provided on one surface of a transparent substrate, and the first and second polarization/separation elements are provided on another surface of the transparent substrate.

9. A pickup for a magneto-optical recording medium for recording information into a magneto-optical recording medium and/or reproducing information from a magneto-optical recording medium, comprising:
   a light source for emitting light;

an objective lens for collecting light emitted from the light source onto an information recording surface of a magneto-optical recording medium;

a light-branching diffraction element provided between the light source and the objective lens for diffracting light reflected by the magneto-optical recording medium that has passed through the objective lens;

first and second polarization/separation elements for polarizing and separating + first-order diffracted light and − first-order diffracted light that are diffracted through the light-branching diffraction element, respectively;

first and second light detectors for receiving and detecting light separated by the first and second polarization/separation elements, respectively;

a first phase compensation element provided on the optical passage of the + first-order diffracted light between the light-branching diffraction element and the first polarization/separation element;

a second phase compensation element provided on the optical passage of the − first-order diffracted light between the light-branching diffraction element and the second polarization/separation element;

a first transparent substrate;

a second transparent substrate; and a holding substrate for holding the first and second transparent substrates, wherein the light-branching diffraction element is provided on the first transparent substrate, and the first and second polarization/separation elements are provided on the second transparent substrate, the first transparent substrate is mounted on a surface of the holding substrate on a side of the objective lens, and the second transparent substrate is mounted on a surface of the holding substrate on a side of the light source, and a through hole is formed in the holding substrate from the surface on which the first transparent substrate is mounted through up to the surface on which the second transparent substrate is mounted to thereby form an air layer for permitting the passage of reflected light from the light-branching diffraction element to the first and second polarization/separation elements.

10. The pickup of claim 9, further comprising:

a diffraction grating for three beams for separating the light emitted from the light source into three beams, wherein the first and second polarization/separation elements are provided on one surface of the holding substrate on which the second transparent substrate is mounted, and the diffraction grating for three beams is provided on another surface of the second transparent substrate.

11. The pickup of claim 9, wherein at least one or more cut-away portions are formed in the holding substrate.

12. The pickup of claim 9, wherein a collimator lens is provided between the objective lens and the light-branching diffraction element, the collimator lens being disposed closer to the objective lens than the first transparent substrate and being mounted on the holding substrate.

13. The pickup of claim 9, wherein the holding substrate constitutes a casing for accommodating the light source, and the first and second light detectors.

* * * * *